(12) United States Patent
Kurple

(10) Patent No.: US 9,593,221 B1
(45) Date of Patent: Mar. 14, 2017

(54) POLYOL, ADHESIVE, RESIN, AND TACKIFIER—THIXOTROPIC ADDITIVE

(71) Applicant: Maureen Kurple, Alexandria, VA (US)

(72) Inventor: Karl Vincent Kurple, Alexandria, VA (US)

( * ) Notice: Subject to any disclaimer, the term of this patent is extended or adjusted under 35 U.S.C. 154(b) by 0 days.

(21) Appl. No.: 14/456,798

(22) Filed: Aug. 11, 2014

Related U.S. Application Data

(63) Continuation of application No. 12/259,283, filed on Oct. 27, 2008, now abandoned.

(60) Provisional application No. 60/982,429, filed on Oct. 25, 2007, provisional application No. 61/029,408, filed on Feb. 18, 2008, provisional application No. 61/040,140, filed on Mar. 27, 2008, provisional application No. 61/076,642, filed on Jun. 28, 2008.

(51) Int. Cl.

| | |
|---|---|
| *C08K 3/00* | (2006.01) |
| *C08K 3/30* | (2006.01) |
| *C08K 3/10* | (2006.01) |
| *C08J 9/00* | (2006.01) |
| *C08H 7/00* | (2011.01) |
| *C08K 3/08* | (2006.01) |
| *C08K 3/06* | (2006.01) |
| *C08G 18/76* | (2006.01) |

(52) U.S. Cl.
CPC ........ *C08J 9/0066* (2013.01); *C08G 18/7621* (2013.01); *C08H 6/00* (2013.01); *C08K 3/06* (2013.01); *C08K 3/08* (2013.01); *C08K 2003/0818* (2013.01); *C08K 2003/0825* (2013.01); *C08K 2003/0856* (2013.01)

(58) Field of Classification Search
CPC . C08J 9/0066; C08H 6/00; C08K 3/08; C08K 3/06; C08K 2003/0818; C08K 2003/0825; C08K 2003/0856; C08G 18/7621
USPC ........................................................ 521/176
See application file for complete search history.

(56) References Cited

U.S. PATENT DOCUMENTS

| | | | | |
|---|---|---|---|---|
| 5,834,529 A | * | 11/1998 | Reese | .................. C08G 18/12 521/109.1 |
| 6,025,452 A | * | 2/2000 | Kurple | ................. B22C 1/2273 523/142 |

FOREIGN PATENT DOCUMENTS

| | | | | | |
|---|---|---|---|---|---|
| CA | | 2052487 A1 | * | 4/1992 | ............. C08G 18/06 |
| JP | CA 2052487 | | * | 4/1992 | ............. C08G 18/06 |

* cited by examiner

*Primary Examiner* — David Karst

(57) ABSTRACT

A renewable chemical composition is disclosed for use in a variety of industrial applications. The renewable chemical composition may be reacted with an isocyanate to produce a urethane material. The renewable chemical composition has aromatic groups. The suitability of this material for use in a variety of applications can be adjusted by modifying the acid number, the hydroxyl number, the viscosity, the glass transition temperature, the % solids, the softening point, and other properties. The chemical reactivity and properties can be modified based on processing conditions and temperature as well as the source of renewable raw material. The lignin used in these formulations may be from pulp and paper processing such as semi-mechanical processing, soda processing, kraft processing, or biomass processing, or a by-product of ethanol production. The novel biobased polyurethane formulations range in firmness from flexible to semi-rigid to rigid and are useful in large volume polyurethane applications.

7 Claims, No Drawings

POLYOL, ADHESIVE, RESIN, AND TACKIFIER—THIXOTROPIC ADDITIVE

PRIORITY CLAIM

This application claims the benefit of provisional application 60/982,429 filed Oct. 25, 2007 which is hereby incorporated by reference. This application claims the benefit of provisional application 61/029,408 filed Feb. 18, 2008 which is hereby incorporated by reference. This application claims the benefit of provisional application 61/040,140 filed Mar. 27, 2008 which is hereby incorporated by reference. This application claims the benefit of provisional application 61/076,642 filed Jun. 28, 2008 which is hereby incorporated by reference.

BACKGROUND OF THE INVENTION

This invention relates to polyol compositions, and polyurethane systems, coatings, adhesives, sealants, elastomers, binders, resins, and prepolymers made up of polyol compositions and more particularly to polyol compositions and polyurethane systems containing high amounts of renewable raw materials, and methods of making and using the same.

At the present time foams and polyurethane plastics are made by reacting a polyol with an isocyanate with a functionality of at least 2 (two) or greater. The polyol can be a polyester molecule which has at least a functionality of at least 2 (two) or greater. The polyol can also be a polyether polyol which is made by reacting propylene oxide, ethylene oxide, butylene oxide, or derivatives of molecules such as epichlorohydrin with a molecule such as ethylene glycol or glycerine to produce molecules with various molecule weights, which have pendant Hydroxyl groups and will react with difunctional or multi-functional isocyanates to produce a solid plastic or foam.

At the present time, to produce a rigid foam or a polyurethane plastic it is necessary to react one part isocyanate with one part polyol. This reaction with the isocyanate makes the polyurethane product. A disadvantage of the use of isocyanate is that when the foam is burned, high levels of toxic gases are produced which are generally derived from the isocyanate part of the molecule. In addition, to facilitate the optimal physical and chemical properties of the final polyurethane foam product, additives including blowing agents, surfactants, flame retardant, catalysts, and fillers may be used to facilitate the reaction between the polyol and the isocyanate.

The use of polyurethane reactions to make plastic material is well known in the art, for example as described in both the "Polyurethane Handbook", 2nd edition, edited by G. Oertel, Hanser Publishers, 1993, expressly incorporated herein by reference, and "Riegel's Handbook of Industrial Chemistry", 1983, pp. 372, expressly incorporated herein by reference.

Polyurethanes are a versatile plastic material which can be used in a variety of industrial applications. New market opportunities and business conditions are creating increased need for new materials that provide optimal physical performance while meeting increasing environmental, legislative, and cost requirements. Environmental concerns leading to the phaseout of halogenated blowing agents including chlorofluorocarbons (CFC's), hydrochlorofluorocarbons (HCFC's), and hydrofluorocarbons (HCF's) has led to for more competitive performance of polyurethane in the areas of insulation and flame resistance while meeting environmental mandates.

Further, price increases of petroleum which is used as both a raw material and energy source in production of polyurethanes has also led to increased new for polyurethane formulators to provide solutions that maintain physical performance while being cost effective. A source of opportunity for addressing these needs has been the use of hydrocarbon blowing agents to replace the halogenated blowing agents and new renewable raw materials including agricultural co-products based on vegetable oil and potentially provide an alternative to the price volatility of petroleum based raw materials.

In order to ensure the final polyurethane has the optimal properties and the components have the desired effect increasing attention is being given to additives which can have a large impact on the final properties of the foam. In particular, additives which can make hydrocarbon blowing agents more compatible with standard rigid foam formulation mixtures are of increasing importance. It is an object of this application to address additives, new polyurethane materials, and methods for using additives and new polyurethane materials that may make polyurethane components more compatible and optimize the properties of the final product. Properties of the final product and reaction parameters which are of increasing importance include density reduction with a cost effective amount of environmentally responsible blowing agent. Flame resistance, thermal conductivity, thermal aging characteristics, strength characteristics, and cost are other important considerations that are being evaluated as formulations are being developed to address new market concerns.

In addition, rising costs of petroleum has led to increasing costs of raw materials in the chemical industry and has prompted interest for ways to provide cost stability to customers. In polyurethane applications, adjustments to conventional petrochemical formulations can provide savings in one of five main methods: 1) Decrease amount of isocyanate used; 2) decrease density of overall polyurethane part without a decrease in physical properties; 3) decrease amount of polyol used without a decrease in physical properties; 4) decrease costly additives; and 5) improve processability. In the article entitled "Low Hydroxyl Number Polyester Polyols for Lamination" by Richard Donald et al, describes how one end user group in the polyurethane industry, polyiso laminators, responded to the shortage of polymeric isocyanate and the resulting rising costs by making adjustments to lamination formulations. Typically, isocyanates are more expensive than the polyol components of polyurethane products. By reducing the amount of isocyanate used in the formulation in a cost savings can be made. Further, when the isocyanate supply is reduced these savings are even more critical.

In addition, use of, environmentally friendly, and energy efficient plant components, has introduced new concerns for processing, new questions for polyurethane formulations, and increasing need for compatibility among all polyurethane formulation components. In particular, it is of increasing importance to be able to utilize new polyurethane raw materials in the same way, previous petrochemical based raw materials are used and to have renewable raw materials in the same range of consistency for quality assurance properties. Vegetable oils may require additional processing which leads to increased expense, time, and energy consumption to reach a point where it is more suitable for industrial application. These oils derived from plants require a step to pass air through the oil to oxidize or functionalize the oil with Hydroxyl groups (—OH). Soy oils have been epoxidized in U.S. Pat. No. 5,482,980. US Patent Pub.

20070123597 A1 notes that in addition to fatty acid triglycerides, soy polyols contain low molecular weight species, such as aldehydes and hydroperoxides, which lead to unpleasant odor and prevents their use in automotive applications.

In addition, to adding cost, time, and energy expenditures for these additional processing steps, the resulting material still may result in unsatisfactory final properties when used in polyurethane applications. Polyurethane foam and plastic products, derived from biobased oils are still noted to be flexible and not have the same rigid strength as petrochemicals derived from conventional petrochemical based polyols. In addition, polyurethane formulators are attempting to develop complete biobased systems that can be applied in the same way as conventional polyurethane systems. This has proved difficult due to the differences in formulation and properties which require changes in processing, production, and application. There is a need for renewable raw materials which are versatile, well understood, easy to apply, and consistent to produce and use.

It has been discovered that using a biobased component from another agricultural feedstock can result in a biobased polyol and final plastic product with more of the desired properties. Further, utilization of this abundant natural material rich in aromatic compounds may reduce the need for antioxidant additives to reduce odor, flame spread, improve UV resistance, or act as a biocide. This group of materials in one form is known as lignin. Lignin may also increase the thermal and chemical resistance properties of the final product. The improved thermal properties may include improved thermal conductivity, decreased flame spread, increased char formation; reduced odor, improved heat distortion, improved heat sag, and increased UV resistance.

After cellulose, lignin is one of the most significant components of vascular plant tissue by weight. It is widely available in industrial quantities and is considered a by-product of many high volume industrial processes. At an industrial level in most cases lignin is consumed as fuel, where it is utilized only for its fuel value. Lignin has a unique chemical structure with valuable functional groups which can be utilized in other applications.

The lignin molecule can be used to provide aromatic functional groups which can provide greater strength and rigidity to the polyurethane foam.

In addition, the renewable polyol has increased renewable raw material content and can act as a more versatile polyol in a variety of industrial applications.

The use of the lignin molecule may also significantly improve the moisture resistance of a foam. In fact, when the proper level of lignin is used in a polyurethane foam, the polyurethane foam may have increased water resistance.

Additionally, the electron rich structure of many renewable raw materials derived from biomass sources including lignin provides valuable antioxidant activity.

This antioxidant activity may lead to increasing flame resistance, UV stability, thermal resistance, chemical resistance, improved adhesion, increased rigidity, and increased strength.

In addition, the presence of the lignin can protect the polyol from oxidative degradation at higher temperatures during processing or storage reducing the release of unwanted volatile breakdown components which can be malodorous.

This combination of vegetable oil and aromatic group containing materials from renewable raw resources can lead to increased cost savings, higher yield of useful portion of plant, and more versatile use in a greater number of chemical and plastic markets.

U.S. Pat. No. 3,519,581 (incorporated herein by reference) discloses dissolving lignin in a substantially non-volatile solvent before reacting with a polyisocyanate.

U.S. Pat. No. 3,654,194 (incorporated herein by reference) discloses oxyalkylation of lignin before reacting with an isocyanate.

U.S. Pat. No. 4,987,213 (incorporated herein by reference) discloses the reaction of a solvent solution of lignin with a polyisocyanate compound.

U.S. Pat. No. 6,025,452 (incorporated herein by reference) discloses the reaction of a lignin material with a Sodium content with a polyisocyanate compound.

U.S. Pat. No. 6,054,562 (incorporated herein by reference) discloses the blending of a lignin with a polyether or polyester resin to improve the melt and flow properties.

U.S. Pat. No. 5,196,460 (incorporated herein by reference) discloses the use of lignin with rubber as a tackifier.

U.S. Pat. No. 4,764,596 (incorporated herein by reference) discloses the process of recovering an organosolv lignin.

U.S. Pat. No. 4,546,124 (incorporated herein by reference) discloses methods for altering structure of a phenolic resin to improve strength of a resin in foundry applications.

U.S. Pat. No. 7,109,285 B2 (incorporated herein by reference) discloses methods for synthesizing polyurethane prepolymers for producing polyurethane polymers.

U.S. Pat. No. 6,180,686 (incorporated herein by reference) to Kurth discloses a cellular plastic material comprising the reaction product of soy oil, a crosslinker, and an isocyanate.

U.S. Pat. No. 6,624,244 (incorporated herein by reference) to Kurth discloses an improved material comprising the reaction product of a vegetable oil and an isocyanate.

U.S. Pat. Pub. 20030083394 A1 (incorporated herein by reference) to Clatty discloses foams with improved heat sag and heat distortion temperatures.

U. S. Pat. Pub. 20020192456 A1 (incorporated herein by reference) to Mashburn et al. discloses a carpet backing comprising a polyisocyanate and a mixture of vegetable oil.

U.S. Pat. Pub. 20050282921 A1 (incorporated herein by reference) to Flanigan et al. discloses a cellular material comprising the reaction product of a soy-based polyol, petro-based blowing agent, cross-linking agent, combination of silicone surfactants, and an isocyanate.

U.S. Pat. Pub. 20070123597 A1 (incorporated herein by reference) to Perry et al. discloses a cellular material comprising the reaction product of a soy-based oil exposed to ultra-violet light and an isocyanate.

U.S. Pat. No. 6,420,443 B1 to Clark et al. (incorporated herein by reference) discloses composition for enhanced compatibility in rigid polyurethane foam systems.

U.S. Pat. No. 7,393,465 (incorporated herein by reference) discloses compositions for hydrophobic polyols recovered from renewable feedstocks which are reacted with alkylene oxides.

U.S. Pat. No. 7,268,183 to Wintermantel (incorporated herein by reference) discloses polyurethane compositions for use in pressure sensitive applications.

The article entitled "Low Hydroxyl Number Polyester Polyols for Lamination" by Richard Donald et al. (incorporated herein by reference) describes low Hydroxyl polyester polyol formulations results in laminator plant trials.

OBJECTS OF THE INVENTION

It is therefore an object of the present invention to provide a polyol composition, with an increased level of stability that can lead to greater versatility to produce a final polyurethane product with a wide range of properties.

It is object of the present invention to provide a formulation containing both biobased oil and lignin to provide a polyol which can be reacted to form a polyurethane with a higher degree of firmness and rigidity.

It is a further object of the present invention to provide a stable base resin which is resistant to hydrolysis and can improve the hydrolytic stability of other polymers.

It is a further object of the present invention to provide a stable base resin which has increased thermal stability and UV resistance.

It is a further object of the present invention to prepare a chemical composition that increases the strength and thixotropic properties of materials for use in coating and sealant applications.

It is an additional embodiment of the invention to reduce the release of malodorous volatile organic compounds (VOC) from biobased polyol compositions.

It is a further embodiment to improve interfacial tension to provide increased filler loading.

It is a further embodiment to provide oxidative resistance to a biobased polyol composition.

It is a further object of the invention to utilize a high molecular aromatic carbon-carbon backbone in low temperature and room temperature applications to improve impact resistance.

It is a further embodiment to provide a biobased polyurethane composition with improved heat distortion and heat sag characteristics.

It is a further embodiment to substitute petroleum based chemicals with renewable raw materials.

It is another embodiment to increase properties of flame resistance through the use of aromatic high molecular chemicals derived from a renewable feedstock.

It is an embodiment to address instability problems in polyurethane formulations by using renewable raw materials as additives.

It is an embodiment to provide a polyurethane renewable raw material which can be used as part of a complete system or as a direct replacement for an existing petrochemical based polyol.

It is an additional embodiment to reduce number of additives and complexity of polyurethane formulations by understanding renewable raw materials and using formulations that require less additives.

It is an additional embodiment to prepare a renewable concentrate resin which can be easily adjusted to modify chemical properties suited for each application.

It is an additional embodiment to use a raw material recovered from a renewable feedstock, where the raw material has aromatic and Hydroxyl functional groups, and the raw material is processed to have the optimal flow properties when used in a polyol application.

It is an additional embodiment to use a raw material recovered from a renewable feedstock, where the raw material has aromatic and Hydroxyl functional groups, and the raw material is processed to have the optimal viscosity properties when used in a polyol application.

It is an additional embodiment to use a raw material recovered from a renewable feedstock, where the raw material has aromatic and Hydroxyl functional groups, and the raw material is processed to have the optimal rheological and thixotropic properties when used in a polyol application.

It is an additional embodiment to use a raw material recovered from a renewable feedstock, where the raw material has aromatic and Hydroxyl functional groups, and the raw material is processed to have the optimal rheological and thixotropic properties when used in an adhesive application.

It is an additional embodiment to use a raw material recovered from a renewable feedstock, where the raw material has aromatic and Hydroxyl functional groups, and the raw material is processed to have the optimal rheological and thixotropic properties when used in a binding application.

It is an additional embodiment to use a raw material recovered from a renewable feedstock, where the raw material has aromatic and Hydroxyl functional groups, and the raw material is processed to have the optimal rheological and thixotropic properties when used in a coating application.

It is an additional embodiment to use a raw material recovered from a renewable feedstock, where the raw material has aromatic and Hydroxyl functional groups, and the raw material is processed to have the optimal rheological and thixotropic properties when used in a dispersant application.

It is an additional embodiment to use a raw material recovered from a renewable feedstock, where the raw material has aromatic and Hydroxyl functional groups, and the raw material is processed to have the optimal rheological and thixotropic properties when used in a resin application.

It is an additional embodiment to use a raw material recovered from a renewable feedstock, where the raw material has aromatic and Hydroxyl functional groups, and the raw material is processed to have the optimal rheological and thixotropic properties when used in a tackifying application.

In a further embodiment a polyurethane rigid foam formulation comprising an isocyanate in the range of about 22 to about 80%, a polyether polyol in the range of about 0 to about 50%, a polyester polyol in the range of about 0 to about 50%, at least one additive selected from the group consisting of a blowing agent, a surfactant, and a catalyst in the range of about 0 to about 15%, and at least one renewable raw material selected from the group of a lignin, a sugar, a short chain carboxylate, oil, soybean oil, and a cation in the range of about 1 to about 60% may be obtained.

In another embodiment, an adhesive polyurethane formulation comprising an isocyanate in the range of about 0 to about 80%, a polyether polyol in the range of about 0 to about 95%, a polyester polyol in the range of about 0 to about 50%, and at least one renewable raw material selected from the group of a lignin, a sugar, a short chain carboxylate, oil, and a cation in the range of about 1 to about 60% is obtained.

Another embodiment provides a method for applying an adhesive formulation comprising the steps of:
  combining a renewable raw material, a polyol, and a solvent to form a paste;
  distributing the paste into an aggregate;
  heating said aggregate slightly to remove solvent;
  and setting the aggregate together with renewable raw material and polyol.

Yet another embodiment provides an adhesive formulation where the lignin contains low ash and high solubility in polyols and solvents.

Another embodiment provides a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an high molecular weight phenolic resin where the resin is predominantly lignin which a modified molecular weight property.

Another embodiment provides a process for preparing phenolically blocked polyurethane prepolymers, comprising reacting: a) lignin, b) a polyol, c) an isocyanate, and d) a catalyst.

Another embodiment provides a process for preparing phenolically blocked polyurethane prepolymers, further comprising said catalyst, where said catalyst comprised by an triorganoamine where said triorganamine is further comprised by an alkyl radical, a ring substituent selected from the group consisting of O, S, or a Nitrogen-alkyl substituent.

In another embodiment a blended resin comprising a liquid filler selecting from the group consisting of a reactive diluent, chain extender, or compatibilizer resin is obtained.

In another embodiment, a thickening agent comprised by a lignin material having a modified molecular weight distribution is obtained.

Another embodiment provides a flame resistant chemical system where the flame resistant chemical system is comprised by a lignin material and a flame retardant material; the flame retardant complexes with said lignin material.

It is an embodiment to have a polyol composition comprised by a chemical having a high molecular weight in the range of about 990-1200 daltons, a dark color, a softening point in the range of about 93-155 C, and aromatic groups.

It is another embodiment of the invention to have an interpenetrating network comprising lignin, a polyol, and a flame retardant.

It is an additional embodiment a chemical composition comprises lignin and an acrylic resin.

It is still another embodiment of the invention to have an interpenetrating network comprising lignin and an acrylic resin.

It is an embodiment for a chemical composition comprising a renewable raw material to be processed with high shear mixing utilizing a Hochmeyer ball Mill, Cowles Disperser, or other related equipment until chemical composition melts and flows together.

It is an embodiment of the invention to have a method for increasing the viscosity of a chemical composition comprising by adding lignin to the chemical composition until the viscosity reaches the desired level.

It is an embodiment to alter the softening temperature of a chemical composition by adding lignin to the chemical composition until the softening temperature reaches the desired level.

It is an additional embodiment of the invention to have a chemical composition comprising lignin and a thermoplastic material selected from the group consisting of poly (vinyl chloride)-based resins, polyethylene-based resins, polypropylene-based resins, and poly(methyl methacrylate)-based resins.

It is a further embodiment of the invention to alter the firmness of a polyurethane composition comprising the following steps: adding lignin to said polyurethane composition until the firmness reaches the desired level.

In an additional embodiment, a composition comprising lignin and a biobased material selected from the group consisting of vegetable oil, soy oil, rapeseed oil, palm oil, cottonseed oil, fish oil, jetropha oil, and any other oil is obtained.

It is a further embodiment to have a composition comprising lignin and a biobased material selected from the group consisting of vegetable oil, soy oil, rapeseed oil, palm oil, cottonseed oil, fish oil, jetropha oil, and any other related material; and wherein the lignin has an ion content of less than about 500 ppm.

It is a further embodiment to have a composition comprising lignin and a biobased material selected from the group consisting of vegetable oil, soy oil, rapeseed oil, palm oil, cottonseed oil, fish oil, jetropha oil, and any other oil derived from a biobased source; wherein the lignin has an ion content of less than 2% by weight.

In another embodiment, a lignin concentrate comprising lignin and a biobased material comprising about 0-25%, and preferably about 10% by weight ethylene glycol, about 0-5% preferably about 2% by weight blow catalyst, about 0-7%, but preferably about 4% blowing agent, and about 0-20%, but preferably about 10% propylene carbonate is obtained.

In an additional embodiment a composition comprising lignin is present in the amount about 0-50%, but preferably about 25%, said biobased material is present in the amount about 0-100%, but preferably 20%, a polyol derived from ethylene oxide in the amount of about 0-75% but preferably about 30%, a second polyol having a Hydroxyl number in the range of about 200-800, but preferably 770, in the amount of 0-25%, but preferably 10%, a solvent in the range of about 0-25%, but preferably about 10%; a blowing catalyst in the range of about 0-10%, but preferably about 3%, a blowing agent in the range of about 0-7.5%, but preferably about 1%, and a silicone surfactant in the range of 0-10% but preferably 1% is disclosed.

In another embodiment composition is obtained further comprising a polyol where the polyol is in a ratio to the biobased material and the lignin in a ratio of 5-3:4-2: 5-1.

In another embodiment, a composition comprising a second liquid material selected from the group consisting of a cross-linker, a chain extender, a second polyol, and a solvent where said second liquid material is present such that the lignin content is less than about 30% is disclosed.

A further embodiment comprises a composition where said lignin and said biobased material have a combined insoluble mineral (inorganic ion) content and said total insoluble mineral content of less than 5% by weight.

In yet another embodiment, a composition further comprising a second liquid material selected from the group consisting of a cross-linker, a chain extender, a second polyol, and a solvent where said combined Hydroxyl number value is in the range of about 250-450, and preferably about 370 is disclosed.

In still another embodiment, a rigid polyurethane foam composition comprises a cross-linker, a chain extender, a second polyol, and a solvent where said combined Hydroxyl number value is in the range of about 250-450, and an isocyanate.

In another embodiment, a method for producing a rigid polyurethane composition is provided including the following steps:

mixing a lignin material with a biobased material selected from the group consisting of vegetable oil, linseed oil, castor oil, soy oil, fish oil, and a palm oil to a form a renewable polyol mixture; and mixing the renewable polyol mixture with a polyol composition to form a rigid polyol blend; the rigid polyol blend having a Hydroxyl value for producing a rigid polyurethane foam; mixing an isocyanate composition in a ratio to produce a rigid polyurethane foam.

In another embodiment, a polyol composition comprises lignin and a polyol where said polyol composition has a content of lignin less than 30% by weight of total polyol composition and a viscosity less than about 2,000 CPS at about 100 F.

In still another embodiment, a polyol composition comprising lignin and a polyol where said polyol composition has a inorganic ion content of less than 2% by weight of total polyol composition and a viscosity less than about 5,000 CPS at about 25° C.

In another embodiment, a method is disclosed for producing a rigid polyurethane comprising the steps: mixing a lignin material with a biobased material selected from the group consisting of vegetable oil, soy oil, peanut oil, fish oil, castor oil, tung oil, linseed oil, and sunflower oil to form a stable renewable polyol composition; mixing the renewable polyol composition with a predetermined set of foam additives to form a rigid polyurethane forming composition; and mixing the rigid polyurethane forming composition with an isocyanate; and forming a rigid polyurethane composition.

In another embodiment, a polyurethane foam formulation comprises an isocyanate in the range of about 22-60%, a polyether polyol in the range of about 40-80%, a blowing agent in the range of about 0-15%, and at least one renewable raw material selected from the group of a lignin, a sugar, a short chain carboxylate, vegetable oil, and a cation in the range of about 1-60%.

In another embodiment, a polyurethane composition is disclosed further comprising at least one material selected from the group comprising a sugar, a short chain carboxylate, and a salt.

In a further embodiment, a polyurethane composition is disclosed comprising lignin and a biobased material that has an improved heat distortion, hardness, rigidity, or heat sag performance than a polyurethane composition with biobased material such as soy on its own.

In another embodiment, a polyurethane composition is disclosed comprising lignin and a biobased material and having a higher degree of firmness and reduced isocyanate content than a similar polyurethane composition having with a biobased material with no lignin added.

In an additional embodiment, a polyurethane composition is disclosed comprising lignin and related by-products and having a faster reaction profile than a similar polyurethane composition which does not contain lignin.

In a further embodiment, a polyol composition comprising lignin and a biobased material having a reduced odor than a polyol composition having a biobased material alone.

An additional embodiment provides a polyol composition comprising lignin and a polyester polyol and an increased hydrolytic stability.

A further embodiment comprises a polyurethane composition comprising a lignin, a polyol, and a filler, an improved interfacial tension such that an increased level of fillers are loader at a greater percentage than with a polyol alone.

In another embodiment, a method of producing a biobased polyol composition with reduced odor; mixing a lignin with a polyol composition until lignin is incorporated and uniformly dispersed; adding a biobased material such as vegetable oil to form a biobased lignin polyol composition; mixing the biobased polyol composition at an elevated temperature and pressure until the biobased material is evenly dispersed.

In still another embodiment, a method for producing a polyurethane foam material comprising the step of mixing a blend of at least one polyol, a lignin, and an isocyanate material, where said polyols are mixed with a lignin at elevated temperature until the resin is clear with no seeds or large undissolved particles which are visible to the naked eye.

In yet another embodiment, a composition of polyol, and lignin where said lignin and polyol form a blend that is free of graininess or suspended matter is disclosed.

It is an embodiment to provide a composition of polyurethane having increasing tensile strength and flexural modulus comprising lignin, polyol, and isocyanate.

It is an additional embodiment of the invention to provide a composition wherein the composition of lignin and polyol are mixed together at high temperatures of at least about 250 F for at least about 40 minutes.

It is a further embodiment to provide a method for forming a polyurethane composition wherein the composition comprises lignin, at least one polyol, and an isocyanate, wherein the polyol and lignin initially form a blend, said lignin and polyol blend are combined with isocyanate wherein the lignin polyol blend has a temperature of at least about 90 F.

It is an embodiment of to produce high strength polyurethane boards comprising the steps of: heating the polyol to an elevated temperature; adding lignin; mixing said polyol and lignin to form a blend; said lignin and polyol having a higher acid number; mixing said polyol and lignin blend having a temperature greater than about 90 F and the acid number is reduced to a sufficient level; and allowing said polyol and lignin blend to react with said isocyanate to form a blend.

It is a further embodiment of the invention to have a composition comprising: lignin; and at least one polyol wherein the polyol composition has a viscosity of less than about 7375 centistokes at about 100 F.

In a further embodiment, a composition comprises:

a polyol derived from ethylene oxide or propylene oxide;

at least one renewable raw material selected from the group consisting of vegetable oil and an aromatic group containing raw material having Hydroxyl functional groups; and a material having Hydroxyl functionality selected from the group consisting of triethanolamine, diethanolamine, and water.

It is an additional embodiment to provide a composition comprising: lignin; and at least one polyol where said polyol composition has an acid number of less than about 5 mg KOH/g.

It is an embodiment to produce a low density foam comprising lignin including an inorganic ion content of greater than about 1% and up to about 7% by weight of the inorganic ion to the weight of the lignin.

It is a further embodiment to provide a renewable raw material with a polyol resulting in a mixture with an initial set of properties including: a first Hydroxyl number, a first acid number, a first viscosity, and a first molecular weight distribution, where the polyol and renewable raw material are processed together until at least of the initial set of properties is changed to provide a polyol better suited for industrial application.

SUMMARY OF THE INVENTION

The chemical compositions and methods of the present invention preferably employ: a renewable raw material having aromatic functional groups used in applications which typically utilize a polyol comprised primarily of petrochemical materials. In another embodiment, the compositions and methods of the present invention preferably employ: (a) a renewable raw material having aromatic functional groups in applications which typically utilize a polyol comprised of petrochemical materials and some amount of renewable materials such as soy. In another embodiment the compositions and method further employ water, polyol, isocyanate, and an additive such as a surfactant, catalyst, or blowing agent or all of these components.

Viscosity is an important property in selecting a polyol, adhesive, resin, thixotropic agent, coating, dispersant or other material. The selection of the particular type of lignin can have an effect on the viscosity of the resin. This change in viscosity is unexpected as typically polyols have a viscosity which is correlated to Hydroxyl number or molecular weight. It has now been discovered that the viscosity of lignin polyols is related to other factors. The way the lignin is produced, the composition of the chemicals used to recover the lignin, and source of the lignin may have an important effect on the composition of the lignin produced. The composition of the lignin will have an important effect on the viscosity of the final lignin polyol produced. In particular automotive applications carbon black is added to polyurethanes to give the dark color and sag resistance and increasing viscosity as disclosed in U.S. Pat. No. 7,361,292 which is hereby incorporated by reference. Instead of utilizing these inorganic fillers and additives, it is aspect of that the renewable raw material can provide a polyol material with the optimum viscosity.

Another aspect of the resins is the amount of the inorganic ion. In the past, it has been shown that the presence of the inorganic ion was to be controlled in order to provide the amount of strength in high density applications. It has now been shown that the type and method for manufacturing lignin is important for the type of lignin and the amount of inorganic ions produced with the lignin. In particular, it has now been found that the level of inorganic ion content can be useful for producing polyurethanes of varying density. In addition, lignins having ions in addition to Sodium can be used. High levels of inorganic ion can be used to produce polyurethanes. Low levels of other ions may be present in the lignin which is used to make a polyol which is used to make a foam. Low levels of other ions may be present in a lignin polyol. The amount of the inorganic ion can affect the reactivity of the lignin in the lignin polyol and the final polyurethane product. The inorganic ion can replace some petrochemical polyurethane materials to effect a low density foam. The inorganic ion level can be provided in trace amounts. In some cases these trace amounts can be used to track the amount of the lignin or aromatic raw material that is used in various applications or the amount of material that ends up in a final polyurethane application.

The amount and type of lignin used can be useful in forming a foam with increased physical properties including: tensile, flex mod, and shear. Formulations can be developed that have improvements in physical performance. The formulations can be altered to have reduced petrochemical content and improved performance.

Lignin polyols can be modified to be have more effective properties as polyols for increased versatility, compatibility, and useful in a greater number of product applications. In particular, as discussed previously, the viscosity of the polyol can be altered based on the type of the lignin used. Additionally, the viscosity of the lignin polyol can be modified after the lignin has been added. This can be accomplished with the addition of material such as propylene carbonate, ethylene carbonate, etc.

In addition to the viscosity, the Hydroxyl number and acid number can also be modified. Thus, lignin polyols can be used to substitute for particular polyols or as an effective part of polyurethane systems. In the past lignin materials have foundered for lack of applications. Modified lignin polyols allows lignin to be more useful in a variety of applications. The lignin polyols can be easily modified from a lignin concentrated polyol. Producing lignin provides a significant advantage over other renewable polyols which must are not versatile or stable to be processed and modified in this way. In some ways, many renewable materials previously have been added as fillers. The addition of these materials does not provide any benefits other than cost reduction. However, these renewable materials add processing limitations and can increase the instability of the system overall. In addition, these renewable materials such as soy come from food applications, which can lead to rising costs for food. These materials may lead to storage and transportation concerns due to the attraction of pests and degradation due to this food source being broken down by for its food value by microbes, bacteria, or other pests.

In particular, the viscosity of lignin polyols may be adjusted by adding a material that has favorable solubility characteristics with lignin and beneficial reactivity with isocyanate. These materials have more effective components and increased stability and long term storage. Each component serves an important role in the lifecycle of the product. Each component may serve more than one role. The formulations are more effective and less inefficient to store and produce. For example, diethanolamine may be used to adjust the acid number, viscosity, and Hydroxyl number. Voranol®770 may be used to raise the Hydroxyl number and reduce viscosity when used in combination with a lignin concentrate resin. A polyol made from both propylene oxide and ethylene oxide may be useful for increasing the compatibility of lignin with other fillers or in waterborne applications. In addition, other materials may be useful for producing resins with a wide range of properties. The lignin polyol can be optimized for versatile modification and easier sale and transportation by modification following formation of a lignin concentrate. The lignin concentrate will be more stable and easier to transport. It can then be transported easily to various manufacturers for use in a variety of applications.

The lignin can be used as part of an adhesive formulation, with other additives and release mechanisms, or cured with a number of different materials. In one embodiment, it is cured with heat and pressure after mixing with aggregate. In one embodiment, the lignin material is effective to use as an adhesive in a solid form that is dissolved in a solvent. In another embodiment, the lignin may be applied as a hot melt adhesive. In still another embodiment, it may be cured with a liquid isocyanate. In another embodiment, it may be used to modify a phenolic resin such as in a shell resin as a thermal shock additive. In another embodiment, it may be cured with a powder isocyanate. In other embodiment, it may be mixed with an blocked isocyanate and later cured with heat. In another embodiment it is cured with a hexamine.

DETAILED DESCRIPTION OF THE INVENTION

The present invention comprises polyol composition or polyurethane systems useful in forming polyurethane foamed plastics. The compositions are useful in other applications such as adhesives, binders, coatings, and resins. The compositions or systems preferably comprise: a renewable raw material having aromatic functional groups.

In another preferred embodiment, the compositions or systems further comprise, in addition to the above-mentioned components, an isocyanate, water, polyol, and at least one additive such as a surfactant, a catalyst, or blowing agent. The composition can be used to efficaciously produce polyols, adhesives, resins, coatings, binders, tackifiers, thixotropic additives, and polyurethane foams while utilizing reduced levels of petrochemicals, fewer additives, and emit less VOC containing and HCFC compounds. In a preferred embodiment, the compositions and systems contain increased renewable raw material content and reduced petrochemical based chemicals including reduced expensive additives and isocyanate content.

The renewable raw material containing aromatic functional groups may be aromatic group containing species derived from pulp and paper processes including Kraft, soda, sulfite, solvent, or steam explosion processes. Additionally, the material may be extracted from cellulosic bioethanol processes. The material may be any number of compounds sometimes referred to as lignin which may be any number of compounds over a broad range of molecular weights.

The biobased oil may include vegetable or seed oils such as soy bean oil, rapeseed oil, canola oil, peanut oil, cotton seed, sunflower oil, olive oil, grape seed oil, linseed oil, castor oil, jetropha oil, fish oils, or oils derived from animal fats.

The polyisocyanates may be selected from aliphatic, cycloaliphatic and aliphatic polyisocyanates, especially diisocyanates, like hexamethylene diisocyanate, isophorone diisocyanate, cyclohexane-1,4-diisocyanate,4,4'-dicyclohexylmethane diisocyanate and m- and p-tetramethylxylene diisocyanate, and in particular aromatic polyisocyanates like toluene diisocyanates (TDI), phenylene diisocyanates, and most preferably MDI methylene bis-phenylisocyanate (diphenylmethane diisocyanate) comprising homologues having an isocyanate functionality of 3 or more (such diisocyanates comprising such homologues are known as crude MDI or polymeric MDI or mixtures of such crude or polymeric MDI with MDI) and modified variants thereof. The polyisocyanates or isocyanate-terminated prepolymers may also be used in the form of an aqueous emulsion by mixing such materials with water in the presence of an emulsifying agent. The isocyanate compound may also be a modified isocyanate, such as, carbodiimides, allophanates, isocyanurates, and biurets Polyols may include polyester polyols, polyether polyols derived from conventional petrochemical sources. The polyols include, for example, polyethylene glycol, polypropylene glycol, diethylene glycol monobutyl ether, ethylene glycol monoethyl ether, triethylene glycol, etc., as well as glycols or polyglycols partially esterified with carboxylic acids including polyester polyols and polyether polyols. Polyols may be of reduced viscosity by combining a solvent. More preferably, the solvent is selected from the group of octyl alcohol, isopropyl alcohol, methyl alcohol, acetone, carpryl alcohol, propylene carbonate, gamma-butyrolactone, 3-pentanone, 1-methyl-2-pyrrolidinone, methyl ethyl ketone, methanol, and combinations thereof.

In addition, soy-based polyols such as described in U.S. Pat. Nos. 6,180,686 and 6,624,244 (both patents are hereby expressly incorporated by reference).

Any polyol component used for producing the general polyurethane structure can be used. To be more precise, polyether polyol that includes ethylene glycol, propylene glycol, diethylene glycol, dipropylene glycol, glycerin, trimethylolpropane, 1,2,6-hexane triol, triethanolamine, pentaerythritol ethylenediamine, tolylenediamine, diphenylmethane diamine, tetra methylol cyclohexane, methylglucoside, cyclohexanol 2,2,6,6-tetrakis (Hydroxyl methyl), diethylenetriamine and diethylenetriamine are chain elongated by propylene oxide, ethylene oxide and butylene oxide, or polyurea dispersion polyol, amine modifier polyol, poly tetramethylene ether glycol can be exemplified. Also, polyester polyol etc obtained by condensation polymerization of multiple alcohol and diacid base can be exemplified. Further, polyols for use in open celled foams as disclosed in U.S. Pat. No. 6,211,257 and U.S. Pat. No. 6,066,681 (which are both hereby incorporated by reference), polyols for use in pour-in-place water heater foam insulation systems as disclosed in U.S. Pat. No. 6,148,774 (which are hereby incorporated by reference), and polyols for use in low density water-blown rigid foams with flow and dimensional stability as disclosed in U.S. Pat. No. 5,627,221, and U.S. Pat. No. 5,420,169 (which are both hereby incorporated by reference) also can be used.

In one embodiment of the present invention, the resin utilized is at least one epoxy/hydroxy-containing resin. As used herein, the term "epoxy/hydroxy-containing resin" refers generally to a composition that comprises both epoxy and hydroxy functionality. Such a resin can be obtained, for example, by mixing one or more epoxy-containing resins and one or more hydroxy-containing resins. Alternatively, one or more resins having both epoxy and hydroxy functionality can also be used. Examples of hydroxy-containing resins include, for example, hydroxy functional polyesters, polyethers, polyurethanes, or acrylics, prepared using methods generally known to those skilled in the art. Epoxy functional resins can include, for example, acrylics having a glycidyl moiety, such as glycidyl methacrylate. The resin used can also be something that is typically regarded as an epoxy crosslinker, such as triglycidyl isocyanurate ("TGIC"). Polyepoxides can also be used as a source of epoxy functionality. The polyepoxides used in the present compositions are those that are suitable for use in powder coatings, such as those that contain at least two 1,2-epoxide groups per molecule. In general, the epoxy equivalent weight can range from about 180 to about 4000 based on solids of the polyepoxide, such as between about 500 and 1000. The polyepoxides may be saturated or unsaturated, and may be aliphatic, alicyclic, aromatic, or heterocyclic. They may contain substituents such as halogens, Hydroxyl groups, and ether groups.

Suitable classes of polyepoxides include epoxy ethers obtained by reacting an epihalohydrin such as epichlorohydrin with a polyphenol in the presence of an alkali. Suitable polyphenols include resorcinol, catechol, hydroquinone, bis (4-hydroxyphenyl)-2,2-propane (Bisphenol A), bis(4-hydroxyphenyl)-1,1-isobutane, bis(4-hydroxyphenyl)-1, 1-ethane, bis(2-hydroxyphenyl)-methane, 4,4-dihydroxybenzophenone, and 1,5-dihydroxynaphthalene. The diglycidyl ether of Bisphenol A is especially suitable. Epoxy resins are commercially available from Resolution Performance Products in their EPON line of resins. Particularly suitable are EPON 1001, EPON 1002, and mixtures thereof.

Other suitable polyepoxides include polyglycidyl ethers of polyhydric alcohols. These compounds may be derived from polyhydric alcohols such as ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols, provided they meet the Tg limitations needed to maintain stability in the composition of the present invention. Some of these compounds may need to be treated to make them sufficient for use in powder coatings. Epoxy functional acrylic polymers can also be used as starting materials, such as glycidal methacrylate (GMA), as can other epoxy functional compounds, such as triglycidal isocyanurate (TGIC).

Examples of other suitable polyepoxides include polyglycidyl esters of polycarboxylic acids. These compounds may be formed by reacting epichlorohydrin or another epoxy material with an aliphatic or aromatic polycarboxylic acid such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) and polymeric polycarboxylic acids such as carboxyl terminated acrylonitrile-butadiene rubber may also be used in the formation of these polyglycidyl esters of polycarboxylic acids.

Polyepoxides derived from the epoxidation of an olefinically unsaturated alicyclic compound are also suitable for use in the curable composition of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include the epoxy alicyclic ethers and esters well known in the art.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate. When the epoxy-containing resin used in the present invention is a polyepoxide, the powder composition cures in the absence of any additional component.

In the present invention, only one kind of above-mentioned polyol component is used or two or more kinds of the polyol components are mixed.

Over the past several years, the polyurethane has used other alternatives instead of chlorofluorocarbons (CFCs) as blowing agents. In rigid foam, hydrochlorofluorocarbons (HCFC) or water has been used as blowing agents. As HCFCs are phased out, newer blowing agents are being researched. Pentane and other hydrocarbons use as blowing agents has brought up concern about insulation values and additional controls needed in manufacturing areas to handle these flammable blowing agents.

Polyurethanes and polyols are versatile materials which can be used in a variety of industrial applications. Polyols can be used to make flexible foam, rigid foam, coatings, adhesives, sealants, and elastomers. Flexible foams are typically formed following reaction of a polyol (or isocyanate reactive material) with an isocyanate. Flexible foams have densities in the range of 1.2 lb/ft$^3$ to 12 lb/ft$^3$. Generally, flexible foams are found in two forms slabstock having densities ranging from 1.2 lb/ft$^3$ to 12 lb/ft$^3$ and molded having densities 1.8 lb/ft$^3$ to >6 lb/ft$^3$. Rigid foam has five main types: board, laminate, pour-in-place, froth, and spray. Generally, two forms of polyol are used to make polyurethane foam: polyether and polyester. Flexible foams are most commonly formed by polyether polyols. Rigid froth foams also primarily made up of polyether polyols. Rigid laminate foams are made up of primarily polyester polyols. Board, pour-in-place, and spray rigid foams can be made with a combination of polyether and polyester polyols. Additional formulations are possible which vary from these typical formulations.

Coatings, adhesives, sealants, and elastomers made with polyurethane polyols also typically primarily consist of polyether polyols. Elastomers types include RIM, other microcellular, cast, and thermoplastic polyurethanes. RIM elastomers and thermoplastic polyurethanes are typically made primarily from polyether polyols, while microcellular elastomers and cast elastomers are typically thought to be made from a combination or either polyether or polyester polyols. Both adhesives and sealants are typically made primarily from polyether polyols. However, while energy activated coatings and moisture cure coatings are made primarily with polyether polyols, two-part coatings can be made from both polyester and polyether polyols and lacquer and powder coatings are made primarily with polyester polyols.

In addition, to the type of polyol the type of isocyanate has on the type of final polyurethane product formed. Most flexible foams use a TDI 80/20 form of isocyanate, with some molded flexible foams having a densities in the range of 3 lb/ft$^3$ to 6 lb/ft$^3$ using both polymeric MDI and a form of pure MDI. Molded flexible foams having a density greater than 6 lb/ft$^3$ are made primarily from a pure form of MDI. Most flexible foams tend to have a ratio of isocyanate to polyol of less than 1:1, ranging as low as nearly 1:3 or 1:2 or based on percentage 21-24% isocyanate and 53-73 % polyol. Rigid foams have ratios closer to 1:1 and unlike flexible foams, they can have a greater amount of isocyanate than polyol. Rigid foams are primarily made from a polymeric form of MDI with the percentage ranging from 40-66% and polyol content ranging from 10-50 %. Both elastomers and adhesives are made with any of the three main types of isocyanate. Coatings are made primarily from TDI 80/20. TDI 80/20 requires safety and health precautions when using. Polymeric MDI is generally considered easier to work with due to the health, safety, and handling precautions of TDI.

Common concerns working with polyurethanes come from optimizing the isocyanate content of the overall polyurethane. Managing the amount and type of isocyanate used is of primary importance in the polyurethane industry for two reasons: 1) cost and 2) safety. Isocyanate is typically more expensive than the polyol side component. Therefore, adjustments in the polyurethane which can lead even to slight reductions in the amount of isocyanate can result in cost savings which can be important for maintaining existing customers as well as gaining entry into new market applications. Secondly, isocyanates require special handling considerations due to the health effects associated with exposure to these materials before they are reacted with the polyol to form polyurethane products. Special handling considerations include ventilation, temperature controlled storage, and personal protective equipment for workers. These precautionary measures can add to increase overhead and processing costs. A common way to minimize the danger of working with these compounds is to reduce their vapor pressure by raising the molecular weight of these compounds. Raising the molecular weight can reduce the likelihood of airborne exposure and damage to workers' lungs. This adjustment can also lead to an increase in viscosity and further attention must be paid to the effect these changes will have on the reaction with the polyol side components and the performance of the final polyurethane product as well as the final cost.

Another common way to reduce the detrimental effect the short supply and rising costs of isocyanates is by optimizing foam formulations to use or require less isocyanates. Typically, the amount of isocyanate necessary for an effective polyurethane formulation is determined based on the Hydroxyl value of the polyols which are used in the formulation. In particular, the Hydroxyl number is a number arising from a wet analytical method to determine the Hydroxyl content of a polyol. This value is determined with the milligrams of potassium Hydroxide equivalent to the Hydroxyl content in one gram of polyol or other compound. The Hydroxyl number provides a quantitative measurement of the number of functional groups that are available to react with the isocyanate. The isocyanate provides the source of NCl groups to react with Hydroxyl groups from the polyol, water, and cross-linkers in the formulation. The proper amount of isocyanate required to react in a stoichiometric amount with the Hydroxyl group of the polyol (or other side B components) can then be determined using the Hydroxyl number. The isocyanate index is a ratio of the actual amount of isocyanate used to the theoretical amount of isocyanate.

In the area of laminator formulations, it is a general concern that reducing the OH number of a polyester polyol will cause the polyurethane having an index of approx. 2.5 to be softer and have reduced dimensional stability and thermal stability. However, there may be a Hydroxyl number that could be used which would result in a decreased need for isocyanate without causing significant decrease in physical properties. Further, formulations may be able to withstand decreases in the Hydroxyl number, by increasing the functionality and the aromatic content of the polyol.

This invention improves the performance of polyurethane compositions and reduces cost by providing a hard polymer segment from a renewable raw material. In this case, the lignin has several aromatic groups which can provide hardness or rigidity to the polyurethane product. The use of lignin may be able to contribute to an overall cost reduction by decreasing the amount of isocyanate necessary to produce a foam with an acceptable level of firmness. The isocyanate index can be reduced. In addition, the inclusion of renewable raw material which is independent of the cost of oil can also lead to a decrease in the amount of polyol needed which can further reduce costs. Further, the use of lignin may enable a polyurethane product to have strength properties of an equivalent polyurethane product of higher density. This increased strength performance of the lignin polyurethane at a lower density would result in an overall reduction in the amount of polyurethane used. This would also provide a significant cost reduction. Further, effective strength properties would enable lower density polyurethane products to be used. Properties such as thermal conductivity in insulation applications are generally known to be more optimal with lower density polyurethane. The favorable strength properties of lignin would enable lower density polyurethane to be used in these valuable applications.

In flexible foams, like slabstock foam, water is used as a primary blowing agent. Methylene chloride has been used as an auxiliary blowing agent. Carbon dioxide, all water systems, and other configurations are being used in response to the more stringent standards for working with materials like methylene chloride.

The additives used can be one of several picked from the following: catalysts, blowing, and surfactant. Catalysts such as Dabco 8154, DMDEE, DABCO 33 LV, and DMEA, are useful gelation or blowing catalysts. The amount of tertiary mine catalyst required used in the desired polyurethane is low, from between 0.05 php to about 1.00 php of the entire foam making composition. DABCO 33 LV is a tertiary amine catalyst available from Air Products and Chemicals Inc. The surfactant stabilize the foam's cell structure during dispensing, curing and the post-expansion processes, which occur as a result of CO, generated by the reaction of the free isocyanate with moisture in the air. The surfactant can also assist in the control of the open cell to closed cell ratio that which provides dimensional stability and affects the foaming pressure of the final cured foam. Examples of commercially available surfactant suitable for use in the present invention include, those typically used in closed cell rigid foam applications such as DC 197, DC 193, B 8853, B 8462, B 8407, B 8404, L-5340, L-5420, L-61900; surfactant used for high resilience molded foam such as, DC 5164, DC 5169, B 81638, B 8681; and surfactant used for high resilience slab foam such as DC 5043, B 8707, and B 6881. The DC series of surfactant is available from Air Products, the B series is available from Goldschmidt and the L-series is available from OSI Specialties. Most preferred are the commercially available rigid type silicone surfactant. Most preferred are surfactant such as L-5340, L-5420, DC-197 and DC-193. Surfactant may also used when mixing the polyol with the renewable raw material.

While it may have other functions as well, (and without intending to be bound by the theory) the lignin employed in the compositions and methods of the present invention are used primarily without limitation, to increase the rigidity of the polyurethane product. The lignin is electron rich and has aromatic groups which increase the firmness of the final foam and provide important antioxidant advantages to the polyol. The lignin can be used to impart increased adhesive properties and chemical resistance properties to the polyol. The interfacial tension of the polyol can also be used to help achieve higher levels of filler loading of both solid fillers such as mica, glass, or carbon black or fillers. The lignin may also be used to increase strength so that lower amounts of carbon black or other fillers and additives can be used while maintaining or increasing strength properties without hurting viscosity or flow properties. In flexible foam, fillers are known to increase the density, but the majority of other physical properties in typical petrochemical polyurethanes decrease as a result of filler loading.

The lignin has a high molecular weight with functional groups which may be used to react with other materials. The lignin contains a carbon-carbon backbone formed from carbon dioxide naturally sequestered from the atmosphere. The lignin is formed as part of natural processes in the plant which requires only renewable reactants such as in addition to carbon dioxide, sunlight, and water. The lignin has important adhesive and structural groups which serve an important role in plant tissue and when recovered can provide these similar attributes in industrial applications while providing a favorable carbon balance and environmentally friendly advantages needed in the industrial marketplace.

Lignin acts a high molecular weight polymer and can be formulated with other chemicals from petrochemical or renewable feedstocks in chemical compositions. Lignin can be used with other additives and solvents to act with a resin or as an adhesive primarily on its own. In some cases, the chemical composition can be formulated with additives that are used to recover lignin from its naturally occurring form or from a by-product stream. The lignin along with its coproducts can be recovered for their chemical value and formulated to perform in a new application. More detailed embodiments follow in the examples.

The lignin employed in the present invention are preferably are derived from Kraft process, semi-mechanical processing, solvent processing method, steam explosion process, biomass process, or as a by-product of ethanol processing. The lignin used in the present invention contains inorganic ions and has anash content. The lignin in many embodiments contains Sodium. However, additional cations such as calcium, magnesium, potassium, barium, lithium, or hydrogen may be present in addition to or instead of Sodium. In addition, short chain carboxylates, sugars, salts, and other co-products may be present with the lignin. It is anticipated the formulation of the polyol composition and the polyurethane formulation may be adjusted accordingly in order to achieve the final product with the desired physical properties and reaction profile based on the inorganic ions and other by-products that are present with the lignin. Thus, several different types of lignin are suitable for use in the compositions and methods of the present invention.

It is well known in the art that foams produced as a system can require sensitive adjustments to the following groups of materials: polyol, isocyanate, catalyst, blowing agents, surfactants, dyes, fillers, and other materials in order to achieve the desired properties. Necessary properties often can only be achieved by balancing the right ratio of these components in combination with one another. With so many components providing different effects to the final properties of the desired product, biobased materials and new materials based on renewable feedstocks having different effects on the final properties on the foam provide an entirely new set of challenges for the formulation chemist to prepare to understand and control. It is well known in the art that biobased materials such as vegetable oil tend to be flexible. It is also well known in the art that biobased materials such as vegetable or soy oils are made up of a wide range of compounds and may release these odors during their use. The low molecular weight compounds may be removed with a process such as vacuum stripping.

Alternatively, antioxidants can be added after the foam to reduce the formation of odorous compounds such as aldehydes. Antioxidants that are disclosed in Pat. Pub. No. 20070123597 include PUR68 and PUR55, manufactured by Ciba Specialty Chemical of Charlotte, N.C. However, with each process step cost, time, and energy expenditures are being added to the final product. Further, the inclusion of additional additives increases complication to the formulation and the level of challenge to understanding the interaction of all of the effects of the various components on the final foam.

Chemicals derived from petroleum are subject to price volatility linked to the rising cost of oil, have a depleting supply. Further their synthesis, use, and disposal may have adverse effect on the environment. It is well known in the art that formulations requiring less components are easier to implement and can be less costly to use and easier to adjust and more versatile for us in a variety of applications. The complementary use of another renewable material has synergistic environmental and economic impact by increasing the renewable raw material content. The lignin may help to reduce the complication of the formulation by providing antioxidant and aromatic functional groups which may help address two areas of concerns for typical biobased materials: 1) increasing the rigidity of the foam and 2) increasing composition of antioxidant material to reduce odor. Further, the antioxidant content of the blended polyol composition can lead to complementary interaction with other expensive additives in the system to increase their effect while reducing cost. In addition, the antioxidant content may allow the polyol to be heated to higher temperatures without leading to the breakdown and release of low molecular weight materials from the resulting renewable polyol composition. In addition to increasing the rigidity of biobased formulations comprising vegetable oil, the lignin may increase the rigidity such that the level of isocyanate used in the formulation can also be reduced.

Further, the aromatic rings in the structure of the lignin provide important antioxidant advantages. The advantages of this structure can be imparted to other resins, chemicals, and finished systems the lignin is blended with. These advantages include: increased hydrolytic stability, increased flame resistance, increased rigidity, and other properties which benefit from the electron rich structure. Further, in the case of use with flame resistant materials or additives, the antioxidant character of the lignin can extend the network of flame resistant chemicals while maintaining the strength of the resin and reducing the cost. Typically, flame resistant chemicals can hurt the physical properties of the resin or the final plastic product. Further, in some cases flame resistant additives can be toxic, release noxious fumes, be difficult to work with, and can lead to increased cost of the product. Lignin has the advantage in that in addition to its antioxidant characteristics it is comprised by a high molecular weight network of aromatic functional groups. In addition, to extending the antioxidant network the lignin also adds strength and potential bonding sites.

Further, the inherent chemical and thermal resistance properties of lignin enable it to provide stability and other advantages that benefit shelf-life and enable resins for use in a wider range of applications with more versatile performance. In particular, lignin has been added to complete systems for reaction in final plastic products. However, it is noted as an embodiment that lignin can be blended or added to increase chemical resistance or improve storage life of resins. Resins can utilize benefits of hydrolytic stability imparted from lignin to increase shelf-life. In particular, polyester resins can benefit from increased hydrolytic stability. In addition, lignin can be used to increase UV resistance as well as to improve flow properties at high temperatures and increase impact resistance, adhesion, and viscosity at low temperatures. Further, lignin can be used in adhesives, sealants, and coatings to provide the desired thixotropic properties without having to additional resin or fillers or other additives.

This use of lignin to provide important both functional chemical and bulk physical properties can result in increased performance and reduced cost of the resin in the final part application as less resin is lost and therefore less resin has to be used before the resin is cured. Inclusion of lignin into the base resin increases number of applications for use of lignin and increases the versatility of the base resin. Fewer additives can be used in the base resin to increase storage life and improve performance, so more effective and rigorous final applications can be developed.

The final polyol compositions preferably employ the lignin and by-products at a level of between about 0% to about 99.9%, by weight of the final composition. The final polyurethane system employ lignin and by-products at a level of between about 0% to about 99.9% by weight of the final composition and preferably about 00.1% to about 60%.

By adjusting the type and amount of lignin used as well as the reaction rate by adjusting the final formulation including the co-products such as water, inorganic ions, salts, short chain carboxylates, isocyanates, and the use of additives such as the blowing agent, surfactant, and catalyst different types of physical properties can be achieved utilizing renewable raw materials in the areas of rigid and flexible polyurethane foams. Flexible polyurethane foams have not been made previously containing large amounts of renewable raw material content such as lignin previously. Further, the effect of the lignin and the by-products incorporated with the lignin where not previously considered for their effect on the entire polyurethane reaction system. Here, both the lignin and the associated by-products are considered for their reactivity and other elements of the chemical composition are adjusted accordingly to provide the optimal reactivity and physical properties of the final product. The other reactants of the foam including the polyol, catalyst, and blowing agent can be adjusted accordingly to provide the optimal solubility, reactivity, pH, viscosity, gellation, and reaction profile based on the lignin and other by-products.

Formulations containing high amounts of renewable raw material can be used to lower dependence on conventional petrochemicals including those produced with foreign oil. Inclusion of higher amounts of renewable raw material may also have the added benefits of reducing cost, reducing HAP, VOC, carbon dioxide, and other green house gas emissions.

Further, formulations made from higher amounts of renewable raw materials take advantage of higher molecular weight materials that consist predominantly of a carbon-carbon backbone synthesized from carbon dioxide sequestered from the atmosphere. Utilizing materials recovered from this natural biosynthetic pathway have the benefits of reduced cost, lower volatility, increased adhesion, improved strength, neutral carbon emissions, and entropically favored.

The use of the proper formulation may enable lower cost renewable raw materials to be used in higher amounts based on the reactivity and the solubility characteristics of the renewable raw material in combination with the polyol, processing aids, co-reactants, catalysts, and in some cases solvent which will be better understood by considering the detailed examples which follow.

In particular, it is possible in specific embodiments to increase the use of other materials such as ethanol which are also obtainable from natural or biotechnological pathways to further reduce the amount of petroleum used in the overall product. Additionally, other resins may be developed which reduce the need for formaldehyde, phenol, or isocyanates which emit large amounts of HAP's or VOC's. Formulations are possible which make use of the high molecular weight of lignin and require less and in some cases little or no isocyanate in order to make valuable adhesives, binders, coatings, and resins. This reduces cost and improves convenience of handling resins which contain reduced amounts or no isocyanate.

The unique combination of biobased materials including soy oils with lignin results in a polyol with a higher renewable content and a rigid polyurethane formulation.

Further, it has been observed in order to achieve the optimal results the following discoveries have been made. Lignin is useful in producing rigidity to the polyurethane composition. However, increasing the lignin level beyond 30% in the polyol composition does not lead to increased rigidity in the resulting polyurethane formulation. Further, at increasing levels of lignin leads to an increase in viscosity. At a level above 30%, the polyol composition is dramatically more difficult so that the levels of the lignin should be kept below 30%. Additives such as diethanolamine, or propylene carbonate can be used to lower the viscosity. Further, the diethanolamine can be used to reduce the acid number of the polyol.

In addition to combining the lignin with a biobased material, a third material such as polyol can be used to provide the desired final qualities to the final polyurethane product. For example, a polyol with a high Hydroxyl value can be selected to increase the Hydroxyl value of the polyol mixture so that it can be combined with an isocyanate to produce a rigid polyurethane. Additionally, a polyester polyol with good burn properties that works with a complement fire resistance mechanism such as increase of char formation to complement the antioxidant network of lignin to provide increased flame resistance characteristics. Additionally, a polyol with a low viscosity can be selected in order to decrease the viscosity of the overall system for easier application or so that higher levels of filler loading can be achieved to reduce cost. Additional polyols selected may include those polyether polyols made from propylene oxide and ethylene oxide, to increase the compatibility between lignin and the biobased material. Additionally, a polyol with a high flash point and an oxidative stability may be chosen, so that the lignin and biobased material may be heated at a high temperature for extended periods of time to remove unwanted low molecular weight species and potential odor causing materials. This step could be used in place of blowing air through the soybean oil.

Additionally, the soybean oil and the lignin both will contain minerals such as phosphorus, iron, sulfur, tin, Sodium, calcium, and others. The total weight of these elements should be monitored and kept below 500 ppm of the total blend to prevent unwanted precipitated particles from occurring in the mixture. In the event that there are noticeable specks or particles in the mixture, additives such as diethanoloamine, or solvents propylene carbonate can be used to potentially help dissolve these particles. Mixing at higher temperatures may also help to dissolve and breakdown these particles. Additionally, a highly stable heat transfer fluid polyol can be added to increase the temperature range the blend can be heated and mixed.

Further, the lignin is noted to provide important resistance to bacteria and other microorganisms. The use of lignin can help increase the shelf life of the polyol and reduce attack from microorganisms. The use of lignin can also provide UV stability to the polyol and to the polyurethane foam. The lignin can be used as a polyol in adhesive formulation as the favorable interfacial properties can help provide wetting out of fillers which are added to the formulation to increase physical properties and reduce cost. These fillers may be mineral fillers such as calcium carbonate, talc, mica, or glass as well as man made fibers such as kevlar or carbon fiber in addition to natural renewable fibers such as kenaf or hemp.

The selection of the polyol and lignin type and amount for use in the compositions and methods of the present invention is extremely important. Typically, lignin is removed from biomass, plant, or lignocellulosic biomass by separating from cellulose, hemicellulose, and other extractives. One way this is accomplished is through changing the pH of a solution containing biomass material. At high pH, all the components will be dissolved. Using an acid, the lignin could be recovered as a solid precipitate. The lignin may contain residual amounts of acid. The lignin may then be washed with a basic solution to remove the residual amounts of acid and to adjust the pH to an acceptable level. Additional steps of washing may be used to provide the lignin with the desired Acid value, Hydroxyl Value, minerals, and salts. The acid used to precipitate the lignin may be a mineral acid such as sulfuric acid, phosphoric acid, or nitric acid. These acids may be used as a solution in a varying concentration. In addition other acids such as acetic acid may be used and be reused. The source of lignocellulosic material may be hardwood, softwood, grasses, paper and pulp, municipal wastes, agricultural wastes such as straws, corn cobs, corn stover, biomass, and vascular plant tissues of all types and mixtures thereof.

In other methods, the biomass may be fractionated from the biomass using hydrolysis. Dilute acid or concentrated acid may be used to remove the lignin at high temperatures from the hemicellulose, cellulose, and other extractives. The lignin may be washed with a basic solution to provide the lignin with the desired reactivity for the final product applications. As above, the lignin may retain certain ions from the acid or base washings depending on the conjugate ion of the acid or base used. For example, if the lignin is washed with NaOH, some Sodium may remain with the lignin. Depending on the application, it may be preferable to use a different base that will result in the desired final properties of the lignin. For example, it may be preferable to $Ca(OH)_2$ to reduce the level of cation found with the resulting lignin or to wash the lignin with a material with a different ion. In order to match the residual ion with a filler that will later be used with the polyurethane product ie $Ca^{2+}$ with a foam filled with calcium carbonate filler. As mentioned above, the source of lignocellulosic material may be hardwood, softwood, grasses, paper and pulp, municipal wastes, agricultural wastes such as straws, corn cobs, corn stover, biomass, and vascular plant tissues of all types and mixtures thereof.

The lignin may be added as a powder or as a liquid to existing polyol compositions or combined with biobased materials such as vegetable oil which already are in liquid form. The lignin may be added as a liquid at elevated temperatures or the liquid may be added as part of liquid mixture at room temperature. The lignin may be supplied as part of a solution. The lignin used may be in a water soluble or water insoluble form. More than one type of lignin may be used in each formulation. The lignin may be supplied and blended to form a liquid polyol for later use. Alternatively the lignin may be provided as a powder and reacted to form a solid polyurethane material. In another embodiment, lignin may be provided as a solid or liquid and blended with a polyol to form a solid material once cooled to room temperature. This solid material has thermoplastic properties which enables it to be mixed as a solid or melted to a liquid for use in other applications. Different types and forms of lignin can be added to adjust the flow properties, adhesion, reactivity (acid number), solubility characteristics, and firmness of the polyurethane product.

Lignin may used may be obtained from Kraft processes, solvent processes, semi-mechanical processes, soda processes, clean fractionation, acid hydrolysis, or steam explosion processes. Properties of a lignin obtained from a Kraft process are as follows a fire point of 198° C., a flash point of 176° C., a sintering point of 188° C., and a 3% ash content. The kraft lignin may have a pH of 6.5 at 25° C. for a 15% aqueous solution. An example of this type of lignin is Indulin AT supplied by Meadwestvaco Corporation. This kraft lignin may have a bulk density of 26 lbs/ft cubic and a packed density of 32 lbs/cubic ft. The particle size of Indulin AT may be between 25-55 microns.

A sulfur free lignin supplied may have the following properties: pH of ~4 of a 10% aqueous suspension, and 2% ash. This sulfur free lignin is completely insoluble in water while having high solubility in phenolic resins. An example of this form of lignin is Protobind 1052 supplied by Asian Lignin Manufacturing.

Additional forms of lignin which may be used include lignin derived from semi-mechanical pulp and processing as well as lignin recovered from clean fractionation or cellulosic bioethanol production. Lignins used from semi-mechanical pulping may be water soluble and include Sodium and potassium as well as linoleic acid and Sodium carbonate. Additional forms of lignin may include organosolv or lignin recovered from solvent processing pulping operations. An example of this type of lignin is known as Allcell® which was previously manufactured by Repap. This type of lignin is known for having low amounts of Sodium and a low ash content. Allcell lignin has a methoxyl content of about 14-20% which is considered close to native lignin and a glass transition temperature of 130-150° C. The lignin may have an acid number of approximately 16.9 mg KOH/g. Lignins with a smaller particle size of about 30 microns and a narrow melting point range may also be used. Additional types of lignin including lignosulfonate which are water soluble and are commonly used as dyes and dispersants may also be used.

Lignin may refer to a group of compounds over a range of molecular weights. Lignin may also be referred to the source and the industrial process from which it is recovered. Lignin may also include certain by-products that are found with as a result of the industrial process and extraction process from which it is recovered. Lignin may have differing structure, chemical functional groups, and different reactivities based on the method used to extract lignin and the industrial process from which it is recovered. Some types of lignin having a lower ash content are considered to be more pure. Lignin is considered to be water insoluble in its native form and act as a glue or adhesive in vascular plant tissue. However, lignin can be utilized for its chemical properties in many different forms. Lignin can be supplied as a powder or liquid in these formulations. It is preferable when supplied as a powder lignin have a narrow melting point or glass transition temperature range. It is also preferable when supplied as powder lignin have a small particle size 25-50 microns.

What is discovered is that for many polyurethane applications low viscosity with good clarity are preferred. In order to facilitate the effective combination of lignin and additional biobased materials, the low viscosity formulations have been identified which lead to faster, processing and greater versatility with additional chemicals for other applications. The small particle size is advantageous for providing low viscosity blends of polyol quickly with excellent stability and reduction in suspended particles or graininess in the polyol. The viscosity of the polyol can be increased by adding lignin for adhesive and binder applications where high viscosity and tack are required and decreased by adding solvent or decreasing the amount of lignin where the level of viscosity will not be advantageous.

Further, in addition to viscosity, the clarity of the blend and long term stability of the lignin and biobased material can be increased. Lignin and biobased material can be selected for low levels of inorganic ions to increase compatibility and improve miscibility between the two materials. Additionally, when used with lignin the biobased material can be heated at higher temperatures for extended periods of mixing to ensure adequate distribution, incorporation, and blending has been achieved. Additionally, another material such as a polyol with high oxidative resistance can also be used to enable greater mixing at higher temperatures to ensure higher quality between the materials. The use of a polyol with oxidative resistance also may reduce the breakdown and release of volatile organic components from the biobased polyol which often results in unpleasant odors.

Further, it is an object to provide complete polyurethane systems with renewable raw materials to replace existing pure petrochemical formulations. One advantage of this approach is the benefits of greater consistency and versatility. While this is a useful attribute to benefit from the valuable chemical properties of lignin in polyurethane formulation, the lignin may also be used as a polyol to replace existing well known polyols. Lignin based polyols can be used to replace existing polyol well known polyols such as Stepan 2352. Stepan 2352 is a aromatic polyester polyol. The lignin polyol may be also adjusted to have the proper Hydroxyl number, acid number, viscosity, as an existing commercial polyol, so that the renewable benefits can be more easily used in applications specifically designed for an existing polyol such as Stepan 2352. The aromatic groups of this renewable raw material could provide valuable benefits and cost savings in contrast to this conventional polyol.

The renewable raw material may include more than one type of renewable raw material and more than one type of polyol. Additionally, the viscosity of the formulation may be adjusted by using liquids such as ethylene carbonate or propylene carbonate. The acid number of the polyol may be adjusted using a strong salt solution such as NaOH, or KOH. Preferably, the acid number may be adjusted by using basic materials with some Hydroxyl groups. These compounds include diethanol amine, triethanol amine, and others. These compounds may also be selected for their effect on viscosity. Further, the viscosity and the Hydroxyl number may be adjusted by using highly functional materials with Hydroxyl numbers of cross-linkers including glycerine, diethanol amine, triethanol amine, Voranol 800, Voranol 360, Voranol 446, and Quadrol. Additionally, catalysts may be selected based on their viscosity, Hydroxyl value, or acid value. For example, catalysts with a high Hydroxyl value such as Air Products Dabco 33-LV may be used as part of the polyol blend to provide the customer with a polyol that is already catalyzed with optimal viscosity and Hydroxyl number to balance the OH groups of lignin.

Further, chain extenders such as ethylene glycol, diethylene glycol, triethylene glycol, tetraethylene glycol, propylene glycol, dipropylene glycol, tripropylene glycol, 1, 4 butane diol, and diethyl toluene diamine may be used to provide a renewable polyol blend with the optimal Hydroxyl number, viscosity, stability, adhesion, or other characteristics that affect the properties of the polyurethane product.

Additionally, the properties of a polyol blend comprised by renewable raw materials can be adjusted to result in a polyol that is readily accepted for use in the polyurethane industry and addresses the previous limitations of renewable polyurethane materials not having the necessary range or consistency of petrochemical derived resins. Additionally renewable component such as lignin, vegetable oil, celluloses, sugars, short-chain carboxylates, carbonates, and mixtures may be added to adjust the properties of the polyol and/or preferably affect the properties of the final polyurethane product.

Further, the lignin may be added to increase the viscosity of the polyol or polyurethane product.

The higher viscosity can be used to increase the wetting out with fillers or the increase the adhesion in certain applications. Further, in order to facilitate faster reaction without the use of increasing additives such as catalysts, the polyol can be heated to reduce the viscosity and directly reacted with the isocyanate with greatly reduced need for catalyst, surfactant, and blowing agent. The increased temperature may lead to a faster reaction time without requiring the need for additional catalyst additives. Further, prior to reacting with the isocyanate the polyol blend may be processed at higher temperatures to facilitate higher quality blending and stability of the final blend. Heating for extended period of time may also remove an unwanted amount of water from lignin when supplied as a water or mixture with water. The antioxidant character of the lignin will enable other biobased components with undesirable VOC's to be heated for longer periods of time due to the increased stability, homogeneous nature of the blend, and allowing for reduction of the odor in some cases. The processing at high temperatures will reduce graininess of resin when examined on a glass plate. The graininess may pose a problem for some processes which require very small diameter orifices for the injection of polyurethanes at high pressure.

In preparation of the polyurethanes from polyols, preferred renewable polyol compositions include: 1) from 0.05 to 95% by weight (more preferably 1.5% to 30%) of a renewable material; 2) from 5% to 99% of a polyol blend by weight; 3) from 0.00% to 17% by weight additives 4) from 0.00% to 7% by weight catalyst; 6) 0.00 to 7% surfactant; and 7) from 0 to 30% filler; and all amounts being based on the total amount by weight present in the total polyol composition. Other additives and fillers may be present typically in the range of 1 to 30% by weight of the total polyol composition.

Additionally, a polyol intermediate resin or a solid adhesive resin may be prepared: 1) from 0.05 to 95% by weight (more preferably 60% to 85%) of a renewable material; 2) from 5% to 99% by weight (preferably 5% to 30%) of a polyol blend; 3) from 0.0000001% to 15% inorganic Ions and optionally 4) a low viscosity liquid such as methanol, methyl ethyl ketone, propylene carbonate, etc. For either compositions, the renewable material may be in the form of a liquid or a powder. The amount and type of the renewable material may be changed to adjust the viscosity, Hydroxyl number, glass transition temperature range, acid number, softening point, solubility, reactivity characteristics, and other properties.

TABLE 1

Elemental Breakdown of Commercial Lignin Including more than one Ion

| Inorganic Ion of Lignin type 3 | Ppm |
|---|---|
| Na | 66000 |
| Al | 61 |
| Ba | 13 |
| Ca | 1400 |
| Fe | 1100 |
| K | 6100 |
| Mg | 190 |
| Mn | 45 |
| P | 200 |
| S | 770 |
| Si | 140 |
| Sn | 78 |
| Sr | 5 |
| Sum | 76097 |

Polyol and polyurethane compositions can be produced with renewable aromatic material having more than one inorganic ion and the level of an inorganic ion content as high as about 6.6% for Sodium and as low as about 5 ppm for Strontium. Additionally, the total inorganic ion level may be as high as high as 7.61%. The inorganic ions can be used to increase the speed of reactivity of the reaction to produce low density waterblown foams. The inorganic ions can act as catalysts or other types of reactants.

Another aspect of the resins is the amount of the inorganic ion. In the past, it has been shown that the presence of the inorganic ion was to be controlled in order to provide the amount of strength in high density applications. It has now been shown that the type and method for manufacturing lignin is important for the type of lignin and the amount of inorganic ions produced with the lignin. In particular, it has now been found that the level of inorganic can be useful for producing polyurethanes of varying density. In addition, lignins having ions in addition to Sodium can be used. High levels of inorganic ion can be used to produce polyurethanes. Low levels of other ions may be present in the lignin which is used to make a polyol which is used to make a foam. Low levels of other ions may be present in a lignin polyol. The amount of the inorganic ion can affect the reactivity of the lignin in the lignin polyol and the final polyurethane product. The inorganic ion can replace some petrochemical polyurethane materials to affect a low density foam. The inorganic ion level can be provided in trace amounts. In some cases these trace amounts can be used to track the amount of the lignin or aromatic raw material that is used in various applications or the amount of material that ends up in a final polyurethane application.

The amount and type of lignin used can be useful in forming a foam with increased physical properties including: tensile, flex mod, and shear. Formulations can be developed that have improvements in physical performance. The formulations can be altered to have reduced petrochemical content and improved performance.

Lignin polyols can be modified to be have more effective properties as polyols for increased versatility, compatibility, and utility in a greater number of product applications. In particular, as discussed previously, the viscosity of the polyol can be altered based on the type of the lignin used. Additionally, the viscosity of the lignin polyol can be modified after the lignin has been added. This can be accomplished with the addition of material such as propylene carbonate, ethylene carbonate, etc. Additionally, the molecular weight of the polyol can also be modified with the addition of an amount of renewable raw material. It has been found that lignins with increased amounts of inorganic ions can be useful in polyol compositions and polyurethane applications.

The lignins formulated for use in polyol applications can be reacted with an isocyanate material such as TDI 80/20, polymeric MDI, or pure MDI at a variety of percentages and then added to a heated aluminum mold to produce test samples. The samples can be produced at a variety of densities and ratios with the isocyanate component ranging from about 22% to about 66% by weight of isocyanate to the final polyurethane product. The material is versatile to provide a flexible foam (slab or molded), rigid foam (board, laminate, pour-in-place, forth, or spray), at a variety of densities.

LP-18 and LP-15 Resin was prepared by mixing approximately 80 parts per hundred by weight of a polyol with about 20 parts per hundred of a renewable raw material. Lignin Type 2 was used in LP-18 resin and Lignin Type 1 was used in LP-15 Resin. WL 440 was used in this example for both mixtures but, another polyol may be used. Before the samples were prepared, they are tested for Hydroxyl values based on acetylation reaction catalyzed with Imidazole according to the relevant ASTM standard. The samples were tested for Sodium level prior to combining with the polyol, by digesting in a microwave digester, and then analysis by ICP-OES was completed.

The polyol and renewable raw material were combined under high shear mixing during which time the temperature was raised from room temperature up to about 110 C for up to about 40 minutes. The mixtures could be mixed into a heat reaction vessel or sufficient heat could be generated based on the speed of the mixing. A Cowles dissolver, Hauschild speed mixer, Hockmeyer ball mill, or other suitable device could be used. Both resins were mixed primarily the same way.

Following mixing, the Hydroxyl values were tested again and it was found that the Hydroxyl value of the mixture including the Type 1 lignin was increased to about 293 mg KOH/g and the Hydroxyl value of the LP-18 mixture including the Type 2 lignin was decreased to about 306 mg KOH/g. As a result of processing with a conventional petrochemical polyol, in this Instance WL 440 from Huntsman, two different renewable materials could be processed to have a closer range of Hydroxyl values to within 5% despite starting out with values that differed by as nearly 40%.

However, the source of the lignin and the Sodium level was shown to have a large effect on the final viscosity of the polyols as the LP-18 resin has a Viscosity of about 1985 cP which is about 4 times as large as the value for LP-15. The effect of the selection of the source of the renewable raw material with the right amount of Sodium can be an important part of providing the polyol with the right properties useful for the desired application.

TABLE 3

Softening Point Adjustment Based on Renewable Raw Material Selection and Amount of Polyol

| Sample | Softening point in Silicon Oil, Water Pour Method | Acid/Neutral Equivalent mg KOH/g ASTM D 3643 method | Sodium of Aromatic Starting Material | Polyol % |
|---|---|---|---|---|
| LR 11 | 196.2 F. | 2.44 | 69 ppm | 20% |
| LR 55 | Over 350 F. | 3.18 | 69 ppm | 10% |
| LR 77 | 85 C. | <0.55 | ~1% | 20% |

TABLE 2

Adjustment of Viscosity and Hydroxyl Number based on Selection of Sodium Level and Source of Renewable Raw Material

| Sample Resin Product | % Aromatic Starting Material | Hydroxyl No. of Aromatic Starting Material | Sodium of Aromatic Starting Material | Ash Content | Hydroxyl # ASTM D 4274 of Polyol Product (mg KOH/g) | Visc. Centistokes @100 F. of Polyol Product |
|---|---|---|---|---|---|---|
| LP-18 | 20 | 320-340 | ~1% | ~3% | 306 | 1985 |
| LP-15 | 20 | 230-250 | 69 ppm | <1% | 293 | 494 |

LR 11 and LR 55 were made with the same renewable starting material (Lignin Type 1 see chart below for distinguishing characteristics). However, LR 55 was the result of a combination of about 10% polyol and about 10% methyl ethyl ketone mixed under heat. LR 77 was prepared in the same manner and same ratio as LR 11. However, the renewable starting material used was from a different source and had a higher amount of Sodium, sulfur, and ash. (LR 77 used Lignin Type 2 see chart below for distinguishing characteristics). Further, the type of lignin used is shown to have a different effect on the acid number. As lignin type 2 shows a reduced acid number when present in the composition in the same concentration. The presence of the different types of lignin has a significant difference on the softening point.

Additionally, the use of methyl ethyl ketone is useful to increase the wetting out of a higher amount of renewable raw material with a reduced amount of polyol. The methyl ethyl ketone is easily removed leaving a high solid adhesive resin with an elevated softening temperature.

The softening point and acid # were determined using the relevant ASTM test methods.

The glass transition temperature (Tg) was determined with a six-point line, and the endothermic peak area was calculated using a two-point sigmoidal baseline. Approximately 5 mg to about 6 mg of samples were used. (The samples were hand-ground into powder to obtain good thermal contact between the sample and pan, and to minimize the thermal gradients.)

2—Samples were prepared by adding a clear polyol to a heated vessel. The polyol was heated to approx. 200 C and then the aromatic starting material was added slowly as part of at least three separate aliquots as a solid powder and mixed until the powder was fully melted and mixed into the liquid. A dark solid molten liquid was formed. The mixing was stopped. The heat on the vessel was stopped.

Sample LR 6A was prepared by taking approximately 76% Renewable aromatic material and combining with 24% polyol by weight and mixing together to form a first mixture. This first mixture was used to form a second mixture comprising 20% methanol and 80% of the first mixture by weight. This second mixture was mixed under heat where the vessel was heated up to approximately 200 C for about 30 minutes. A thermoplastic resin with an elevated glass transition temperature range was obtained.

TABLE 4

Glass Transition Temperature and Hydroxyl Value of Renewable Compositions

| Sample Resin Product | % Aromatic Starting Material- | Hydroxyl No. of Aromatic Starting Material | Acid No. of Aromatic Starting Material | Sodium of Aromatic Starting Material | Acid Number of Solid Resin | Hydroxyl value of Resin Product | Glass Transition Temp$^1_{Avg.}$ | Endotherm-$^1$ |
|---|---|---|---|---|---|---|---|---|
| LR-6A-$^2$ | 60.1 | 320-340 | 37.37 | ~1% | 40.49 | 309 | 43.5 | 69 C. |
| LR -32-1 | 80.6 | 240-260 | 38-50 | 69 ppm | 20.1 | 250.0 | 23.0 | 87 C. |
| LR- 32-B | 80.1 | 240-260 | 38-50 | 69 ppm | 21.2 | 255.1 | 39.5 | 72 & 97 C. |
| LR- 32-C | 60.7 | 240-260 | 38-50 | 69 ppm | 20.3 | 240.9 | 22.5 | 80 C. |
| LR 32-D | 80.4 | 240-260 | 38-50 | 69 ppm | 20.9 | 239.5 | 33.5 | 80 C. |

$^1$The samples were sealed in an aluminum hermetic pan and then scanned twice in a TAI DSC 2920 in nitrogen from about −50 C. to about 150 C. at about 20 C./min. The DSC instrument was calibrated with indium and water standards, and the nominal nitrogen purge rate was about 50 ml/min. The glass transition temperature (Tg) was determined with a six-point line, and the endothermic peak area was calculated using a two-point sigmoidal baseline. Approximately 5 mg-to about 6 mg of samples were used. (The samples were hand-ground into powder to obtain good thermal contact between the sample and pan, and to minimize the thermal gradients.)
$^2$Samples were prepared by adding a clear polyol to a heated vessel. The polyol was heated to approx. 200 C. and then the aromatic starting material was added slowly as part of at least three separate aliquots as a solid powder and mixed until the powder was fully melted and mixed into the liquid. A dark solid molten liquid was formed. The mixing was stopped. The heat on the vessel was stopped.

1—The samples were sealed in an aluminum hermetic pan and then scanned twice in a TAI DSC 2920 in nitrogen from about −50 C to about 150 C at about 20 C/min. The DSC instrument was calibrated with indium and water standards, and the nominal nitrogen purge rate was about 50 ml/min.

TABLE 5

Tensile Performance Based on Polyol Content and %

| Sample Resin Product | % Aromatic Starting Material- | Polyol | Acid No. of Aromatic Starting Material | Acid Number of Solid Resin | Hydroxyl value of Resin Product | Glass Transition Temp$^1$ Avg. | Endotherm-$^1$ | Tensile (PSI) Avg. |
|---|---|---|---|---|---|---|---|---|
| LR-32-1 | 80.6 | 100% WL 440 | 38-50 | 20.1 | 250.0 | 23.0 | 87 C. | 12.5 |
| LR-32-B | 80.1 | 100% Terate 2033, polyester | 38-50 | 21.2 | 255.1 | 39.5 | 72 & 97 C. | 16 |
| LR-32-C | 60.7 | 88.2% WL 440 | 38-50 | 20.3 | 240.9 | 22.5 | 80 C. | 35 |
| LR 32-D | 80.4 | 77.1% WL 440 | 38-50 | 20.9 | 239.5 | 33.5 | 80 C. | 15 |

TABLE 6

Changes in Viscosity, Hydroxyl Number, Molecular Weight with Change in Amount of Lignin

| Example | Sample | % of lignin by weight | Viscosity (centistokes @ 100 F.) | Hydroxyl Number mg KOH/g (ASTM 4274) | Est. Molecular Weight Z Avg |
|---|---|---|---|---|---|
| 36 | 15 | 20 | 494 | 293 | 1227 |
| 38 | 16 | 30 | 1532 | 286 | N/A |
| 41 | 17 | 40 | 7375 | 237 | 1321 |
| 39 | 11 | 80 | Solid at room temperature | 105 | 1514 |

While the skilled artisan will appreciate that its selection will depend upon on several factors, such as the nature of the foam application, processing conditions, environmental concerns, cost, the following discussion relates to preferred materials.

Test Set 1

In a suitable vessel use heat and or pressure containing the following (by weight):

Part B-I
205 parts WL-440
225 parts Lignin from a solvent process such as Lignin Type 1

These two components were mixed together with heating up to 300 F for 30 minutes.

In a suitable vessel use heat and or pressure containing the following (by weight): Part B-II
20.5 parts Pluracol 975
22.5 parts Terate 2031

Both these components were mixed and heated for thirty minutes at 250 F.

Part B-II was then mixed with WL 440, water, Surfactant Silo 5420, and Dabco 8154 to yield a composition found in columns 2-3 of Table A. Samples A-C were then prepared by reacting with isocyanate in the procedure following Table A. Part B-I was then mixed with WL 440, water, Surfactant Silo 5420, and Dabco 8154 to yield a composition found in columns 4-5 of Table A. Samples D-F were then prepared by reacting with isocyanate in the procedure outlined below following Table A.

TABLE 7

Polyol Composition A

| Polyol (Part B Components) | Formulation #1 Samples A-C Weight (g) | Samples A-C % by weight | Formulation #2 Samples D-F Weight (g) | Samples D-F % by weight |
|---|---|---|---|---|
| Terate 2031 | 348.5 | 34.1 | 348.5 | 34.1 |
| Pluracol 975 | 317.5 | 31.1 | 317.5 | 31.1 |
| WL 440 | 333 | 32.6 | 158.7 | 15.5 |
| LigninType 1 | 0 | 0 | 174.2 | 17.1 |
| Water | 6 | .6 | 6 | .6 |
| Silo 5420 | 12 | 1.2 | 12 | 1.2 |
| Dabco 8154 | 4 | .4 | 4 | .4 |
| Total | 1021 | 100 | 1020.9 | 100 |

The mixture is then reacted with isocyanate using a vigorous mixing and then added to a heated 12" by 12" by 1" mold which is held at about 160° F. and at a pressure of about 15 psi. The polyols were reacted with the isocyanate Rubinate M (having an NCO % of 30.7) according to the following ratio 1.1 parts isocyanate to one part polyol for samples A and D, 1 part isocyanate to about one part polyol for samples C and E, and 0.9 parts isocyanate to 1 part polyol for samples B and F.

In all cases, the part was removed and was inspected visually to observe a smooth, even surface and durable, uniform, consistent appearance for all the samples. The 15 pcf part is then tested for the following properties tensile, flex mod, and compressive strength.

The test specimens were conditioned for a minimum of 24 hours at the standard laboratory conditions of 23° C. and 50% room humidity prior to testing. The tests were performed in accordance with the laboratory procedures designated below.

TABLE 8

Physical Performance Data

| Samples A-C containing 0% lignin Iso: Polyol ratio | ASTM D 790 Flex Modulus (PSI) | ASTM D 638 Tensile Modulus (PSI) | ASTM D 1621 Compressive Strength (PSI) |
|---|---|---|---|
| A 1.1:1 | 21,201 | 11,488 | 386 |
| B .9:1 | 19,785 | 10,965 | 363 |
| C 1:1 | 20,948 | 10,484 | 382 |

| Samples D-F Lignin containing samples Iso: Polyol ratio | ASTM D 790 Flex Modulus (PSI) | ASTM D 638 Tensile Modulus (PSI) | ASTM D 1621 Compressive Strength (PSI) |
|---|---|---|---|
| D 1.1: 1 | 22,999 | 12,301 | 442 |
| E .9:1 | 22,261 | 12,755 | 471 |
| F 1:1 | 22,069 | 11,938 | 415 |

The tests results obtained for the physical performance of these samples demonstrate the improved physical performance of lignin containing samples in comparison to samples that have are reacted with identical amounts of isocyanate (lignin containing sample D Flex Modulus of 22,999 PSI compared to Flex Modulus of 21,201 for A of the same formulation with no lignin) as well as demonstrating that samples that contain lignin can have reduced isocyanate contents with no loss in properties (F Flex Modulus of 22,069 PSI for a lignin containing sample with an iso ratio of 0.9:1 in comparison to Flex Modulus of 21,201 PSI with an increased iso ratio of 1.1:1 and containing no lignin).

Example I

Three polyols Stepan 2352 (about 181 g), Terate 2031 (about 433 g), and Dow 770 (about 86 g) were mixed at high speed together from a temperature of about 30 F to a temperature of about 250 F. Then about 300 g Lignin was added slowly over a ten minute period and the temperature was raised to about 350 F and mixed continuously at high speed at this temperature for about 1 hour. The blend was cooled to about 150 F and about 6 g of water and about 12 g of L-5420 surfactant were added and mixed.

The blend had the following composition as seen in the two columns A. B and C were prepared later following similar procedures.

TABLE 9

Polyol Composition B

| | A Weight (g) | (by weight) | B Weight (g) | % (by weight) | C Weight (g) | % (by weight) |
|---|---|---|---|---|---|---|
| Stepan 2352 | 181 | 7.8 | 200 | 19.5 | 200 | 19.5 |
| Terate 2031 | 433 | 2.5 | 450 | 43.9 | 450 | 43.9 |

TABLE 9-continued

Polyol Composition B

| | A Weight (g) | (by weight) | B Weight (g) | % (by weight) | C Weight (g) | % (by weight) |
|---|---|---|---|---|---|---|
| Dow 770/391* | 86 | 0.4 | 90* | 8.8 | 90* | 8.8 |
| Lignin Type 1 | 300 | | 260 | 5.4 | 60 | 5.4 |
| Water | 6 | | 12 | .2 | 2 | .2 |
| L-5420 | 12 | | 12 | .2 | 2 | .2 |
| Sum | 1018 | | 1024 | 00 | 024 | 00 |

The mixture of Sample A in the amount of about 370 g is combined with about 290 g of Rubinate M polymeric isocyanate manufactured by Huntsman into a plastic cup and mixed rapidly with a mixer blade attached to a hand drill for approximately about 34 seconds. The temperature of the polyols is approximately 120 F and the temperature of the isocyanate is about 60 F. The mixture is thick, difficult to mix, and very reactive. The contents are placed into a heated 12 inch by 12 inch by 1 inch aluminum mold and a 12 inch by 12 inch by 0.5 inch lid is placed over the mold and slide into a heated press. The press is closed to seal the mold up to a pressure of between 15 and 25 psi. The press temperature is maintained at about 180 F for about 30 minutes. After about 30 minutes the press is opened, the mold is removed from the press, and the polyurethane part is removed as a foam board in the dimensions of 12 inches wide by 12 inches long by 1 inch thick. The part has a smooth surface and a uniform density. Similar procedures were followed for samples B and C, where they were combined with about 266 g of isocyanate each.

The part is measured and found to have a density of about 12 pcf and the following physical properties (The results for the properties listed below were obtained through the listed ASTM test methods and are the average of about 5 samples unless otherwise noted,):

TABLE 10

Example 1A-Renewable Polyol Composition-12 pcf

| Flexural Strength and Modulus (ASTM D790, 64 mm span, 1.71 mm/min cross head speed) | Tensile Modulus (ASTM D3039, 25.4 mm grip distance, 2 mm/min crosshead speed) | Compression Strength (ASTM D 1621, 2.5 mm/min crosshead speed) |
|---|---|---|
| Break Stress (psi): 1823.82 | Tensile Modulus (psi): 59,602 | Compression Strength at 13%*: 138 psi. |
| Yield Stress (psi): 1878.72 | Tensile Strength (psi): 1,145 | |
| Modulus (psi): 75,010 | | |

*Average of 3 samples

This part showed superior physical properties which are not possible with conventional polyurethane at a comparable density.

TABLE 11

Example 1B-Alternate Renewable Polyol Composition (22.7 pcf)

| Flexural Strength and Modulus (ASTM D790, 64 mm span, 1.71 mm/min cross head speed) | Tensile Modulus (ASTM D3039, 25.4 mm grip distance, 2 mm/min crosshead speed) | Compression Strength (ASTM D 1621, 2.5 mm/min crosshead speed) |
|---|---|---|
| Break Stress (psi): 622.00 | Tensile Modulus (psi): 15,838 | Compression Strength at 13%* (psi): 280.12 |
| Yield Stress (psi): 658.59 | Tensile Strength (psi): 621.45 | |
| Modulus (psi): 22,602 | | |

*Average of 3 samples

TABLE 12

Example 1C-Alternate Polyol Composition-10.2 pcf

| Flexural Strength and Modulus (ASTM D790, 64 mm span, 1.71 mm/min cross head speed) | Tensile Modulus (ASTM D3039, 25.4 mm grip distance, 2 mm/min crosshead speed) | Compression Strength (ASTM D 1621, 2.5 mm/min crosshead speed) |
|---|---|---|
| Break Stress (psi): 609.97 | Tensile Modulus (psi): 18,818 | Compression Strength at 13%*: 226.51 psi. |
| Yield Stress (psi): 652.67 | Tensile Strength (psi): 680.03 | |
| Modulus (psi): 19,446 | | |

*Average of 3 samples

Samples 1A were shown to have increased Flex Modulus, Tensile Modulus, Flexural Strength while having increased Lignin content, decreased water, and increased iso ratio than samples 1B and 1C. Further, in Table A Lignin is used to replace WL 440 a polyol having a Hydroxyl number of approx. 330 mg KOH/g. This means the samples with lignin would have a lower Hydroxyl number than samples made without the lignin. Despite having a lower Hydroxyl value, the samples made with lignin have higher physical properties.

Further, in sample A from Example I the samples made with lignin having the highest Hydroxyl value have the greatest physical properties in all categories except compression. The first data set would correspond to polyurethane formulations having a high isocyanate index (where the isocyanate used is slightly more than the theoretical) and the second data set would correspond to polyurethane formulations have a lower isocyanate index (where the isocyanate used is close to the theoretical value in the first data set). Utilizing both data sets shows the ability of lignin to increase physical properties in both high isocyanate and low isocyanate index polyurethane formulations.

Further, comparing results between the two data sets shows the increased performance of Lignin in Example I, Sample A when the polyols are heated and mixed with the lignin for extended periods of time and the lignin is mixed with the isocyanate at elevated temperatures. The increasing physical properties including the flex mod of (about 75,010 psi) shows the increased physical properties that is beyond what is expected in typical polyurethane formulations using only petrochemicals.

Example II

In a suitable vessel use heat and or pressure to blend about 300 parts (by weight) of a lignin and about 700 parts (by weight) of WL-440 (a polyether polyol that is made from a combination of propylene oxide and ethylene oxide) with agitation by using a suitable mixer and heat and higher pressure if necessary. This mixture can be heated to about 200° F. to improve the rate of solution, the mixing is continued until a dark solution results. The solution is allowed to cool to room temperature. The solution can be heated and mixed until any graininess or seeds dispersed within the material are dissolved or broken down as necessary.

Example III

In a suitable vessel use heat and or pressure to blend about 300 parts (by weight) of a lignin and about 700 parts (by weight) of Stepanpol 2352 with agitation by using a suitable mixer and heat and higher pressure if necessary. This mixture may also contain sugars, salts, and short chain carboxylates. The elemental breakdown of this composition is provided in Table 1. This mixture can be heated to 200° F. to improve the rate of incorporation, distribution, and blending of the powder into the liquid. The mixing is continued until a tan, viscous, flowable blend results.

Example III

The blend of Example I is combined with a mixture of polyols. A polyol with an acid number of about 4.18 mg/KOH is obtained. Sodium Hydroxide is added until the acid number of the polyol is reduced.

Example IV

The blend of Example I is combined with a mixture of polyols and is heated to a temperature of about 120 F before reacting with an isocyanate.

Example V

The blend of Example I is combined with diethanolamine until the acid number is sufficiently reduced. The final resin is observed to be substantially clear of clumps and grains.

Example VI

The blend of Example I is combined with a blend of lignin from a semi-mechanical pulping source and water.

Example VII

In order to make a thermosetting polyurethane part, about 1.5 parts of the resin of Example II is mixed with catalyst, blowing agent, and gel catalyst and mixed further with about 1 part of Rubinate R1840 (an ICI product) and poured into a mold and allowed to harden. The mold can be heated as in a compression mold and this will produce a very hard tough plastic. The speed of the reaction, the type of the cells within the foam, the surface of the foam, and the density of the foam will be affected by the mixing, temperature, and combination of the catalyst, blowing agent, and gel catalysts that were added. The hardness of the product will also be affected by the type of particular lignin used.

Example VIII

Lignin is recovered from vascular plant tissue, biomass, or industrial by-product stream resulting in a lignin material comprising cations such as Calcium, Sodium, Lithium, Barium, Hydrogen, or Potassium.

Example IX

The lignin of Example VIII is mixed with a polyol as in Example I. The rate of the reaction with isocyanate as in Example III is controlled by measuring the amount of cations present. In order to make a thermosetting polyurethane part, about 1.5 parts of the resin of Example I is mixed with catalyst, blowing agent, and gel catalyst and mixed further with 1 part of Rubinate R1840 (an ICI product) and poured into a mold and allowed to harden. The mold can be heated as in a compression mold and this will produce a very hard tough plastic. The speed of the reaction, the type of the cells within the foam, the surface of the foam, and the density of the foam will be affected by the mixing, temperature, and combination of the catalyst, blowing agent, and gel catalysts that were added. The hardness of the product will also be affected by the type of particular lignin used. The amount of catalyst, blowing agent, and gel catalyst can be adjusted and in some cases reduced based on the % of cations present.

Example X

Lignin is recovered from vascular plant tissue, biomass, or industrial by-product stream resulting in a lignin material having a high acid content shown by an acid number higher than about 4.0 mg KOH/g.

Example XI

The lignin of Example X is mixed with a polyol as in Example I. The rate of the reaction with isocyanate as in Example IX is controlled by measuring the amount of cations and the resulting pH. The lignin is washed to reduce excess acidity and dried. In order to make a thermosetting polyurethane part, about 1.5 parts of the resin of Example I is mixed with catalyst, blowing agent, and gel catalyst and mixed further with 1 part of Rubinate R1840 (an ICI product) and poured into a mold and allowed to harden. The mold can be heated as in a compression mold and this will produce a very hard tough plastic. The speed of the reaction, the type of the cells within the foam, the surface of the foam, and the density of the foam will be affected by the mixing, temperature, and combination of the catalyst, blowing agent, and gel catalysts that were added. The hardness of the product will also be affected by the type of particular lignin used. The amount of catalyst, blowing agent, and gel catalyst can be adjusted and in some cases reduced based on the resulting acid content and pH of the lignin.

Example XII

Ten parts by weight of about 64% solids mixture of lignin in water is mixed with ten parts (by weight) of WL-440. The lignin is Type 3.

Example XIII

About ten parts (by weight) of the mixture of Example XI1 is mixed with about 15 parts (by weight) of Rubinate R1840 (an ICI product) and allowed to react resulting in a low density foam.

Example XIV

About ten parts by weight of a mixture containing lignin, short chain carboxylate, sugar, and water that is about 64% solids by weight is mixed with about ten parts (by weight WL-440).

Example XV

About ten parts (by weight) of the mixture of Example XIV is mixed with about 15 parts (by weight) of Rubinate R1840 (an ICI product) and allowed to react resulting in a low density foam. Rubinate R1840 (an ICI product) and allowed to react resulting in a low density foam.

Example XX

About thirty parts (by weight) of a lignin powder having a Sodium content of at least about 500 ppm recovered from a semi-mechanical process (Lignin Type 3) is combined with about 17 parts water (by weight), about 69 parts (by weight) Stepanpol 2352, about 1.2 parts (by weight) Silo 540 silicone surfactant manufactured by Occidental Chemical Company, and about 1.51 parts (by weight) of DMDEE catalyst manufactured by Huntsman are mixed together.

Example XXI

Forty parts (by weight) of the mixture of Example XX is mixed with about 65 parts (by weight) of Rubinate R1840 (an ICI product) and allowed to react resulting in a low density foam.

Example XXII

About thirty parts (by weight) of a lignin powder containing an inorganic ion content of greater than 500 ppm of the weight of lignin is combined with about 17 parts water (by weight), about 69 parts (by weight) Stepanpol 2352, about 1.2 parts (by weight) Silo 540 silicone surfactant manufactured by Occidental Chemical Company, and about 1.51 parts (by weight) of DMDEE catalyst manufactured by Huntsman are mixed together.

Example XXIV

About thirty parts (by weight) of WL-440, thirty parts (by weight) of Stepanol 2352 manufactured by Stepan Chemical Company, about twenty parts (by weight) of BASF Pluracol 975, and about 15 parts (by weight) Indulin AT lignin manufactured by WESTVACO are all mixed together with heat under at 250° F. for 30 minutes with moderate stirring. The mixture is cooled to room temperature to form a polyol composition for use in polyurethane applications.

Example XXV

About one hundred parts (by weight) of the mixture of Example XXIV at about 150° F. or below is combined with about 2 parts (by weight) water, about 1 part (by weight) silicone surfactant, and about 1 part (by weight) Dabco 8154 and are mixed together.

Example XXVI

About one hundred seventy-five parts (by weight) of the mixture of Example XXV is mixed with about 150 parts (by weight) of an isocyanate such Rubinate M manufactured by ICI.

Example XXVII

About two hundred grams by weight of Stepanol 2352 will be mixed with about 448 grams of Terate 2031, about 100 grams of Voranol 770, and about 200 grams of lignin recovered from a semi-mechanical pulping process containing Sodium, short-chain carboxylates, and sugars are combined and mixed together to form a polyol composition.

Example XXVIII

About three hundred and fifty grams of the composition of Example XXVII is combined and mixed together with about 1.8 g water, about 1.8 g surfactant 5420, and about 1.8 g Dabco 8154 to form a polyol composition for use in a polyurethane system.

Example XXIX

About one hundred and sixty grams of Allcell lignin is combined and mixed with about forty grams of WL-440. The two components may be mixed together with a low amount of heat to improve the blending. Additionally, other forms of mechanical may be used in addition to hand mixing, a Hauschild speed mixer, Cowles disperser, Hobart, ribbon mixer, may be used to insure the powder is incorporated, distributed, and uniformly dispersed. This mixture is combined with ninety grams of a solvent selected the group of consisting of methanol, methyl ethyl ketone, and another acceptable solvent or mixture of solvents. The solvent is preferably strong enough to dissolve the powder and has a low boiling point. Ethanol may be mixed with a stronger solvent which dissolves the mixture. A sticky paste is produced. This paste is suitable for use in adhesive applications. It can be cured with a crosslinker such as isocyanate, hexamine, or heat. It can be used as part of prepolymer or blocked isocyanate application where high adhesion is required. It can also be cured in aggregate binding applications such as briquettes, foundry, cement, or sand where heat is added and through friction of mixing with the aggregate.

Example XXX

The composition obtained from Example XXIX is combined in a ratio of about 1 part by weight to about 10 parts by weight iron oxide. The iron oxide is mixed with the composition from Example XXIX until the composition is evenly distributed throughout the solid. The composition is then run through a briquetter machine. Solid pellets or briquettes are produced which can withstand a drop test more than about 3 feet without shattering upon impact with the ground. The iron oxide may be heated before adding the composition, additionally it may be heated while the composition from Example XXIX is being mixed.

Example XXXI

The composition from Example XXIX where a blocked isocyanate is added to the composition and mixed together. The new composition may be combined with iron oxide or other aggregate to act as an adhesive or binder with the application of heat.

Example XXXII

The mixture of Example XXVIII in the amount of about 355.4 is combined with about 306 g of an isocyanate such as Rubinate M manufactured by ICI into a plastic cup and mixed rapidly with a mixer blade attached to a hand drill for about 15 seconds. The contents are placed into a heated about 12 inch by about 12 inch by about 1 inch aluminum mold and a 12 inch by 12 inch by 0.5 inch lid is placed over the mold and slide into a heated press. The press is closed to seal the mold up to a pressure of between about 15 and about 25 psi. The press temperature is maintained at about 180 F for about 30 minutes. After about 30 minutes the press is opened, the mold is removed from the press, and the polyurethane part is removed as a foam board in the dimensions of 12 inches wide by 12 inches long by 1 inch thick. The part has a smooth surface and a uniform density.

Example XXXIV

The relevant steps for using a polyol in a coating application is discussed in U.S. Pat. No. 6,855,844 to Geiger which is hereby incorporated by reference. In order to make a polyurethane coating based on the lignin based polyol of example II, one part of the lignin based polyol of example II is mixed with about 1 part of suitable coating solvent depending on the coating application. Then this premix is mixed with about 1 part Rubinate R-1840 and the resulting mixture is used to coat a variety of substances. The viscosity of this resulting mixture can be adjusted with suitable solvents depending on the final coating application. It is understood to those skilled in the art that Kraft lignin (lignin Type 2), lignin from a semimechanical process (Lignin Type 3), lignin from a solvent process (Lignin type 1), lignin from ethanol processing, lignin from biomass processing, or other type lignin may be employed based on the desired viscosity, or the recommended acid number or Hydroxyl value in the formulation.

Example XXXV

About forty parts by weight of 2,4-diisocyanatotoluene and ten parts by weight of 2,6-diicyanatotoluene will be charged to a flask and mixed together in the flask with a mechanical stirrer at 80° C. Three hundred-seventy parts of a polyether polyol having an OH number of about 44 and 0.03 parts by weight of 3-chloropropionic acid will be mixed for five hours at about 80 C in the flask with a reflux condenser. The reaction mixture will be prepolymerized with stirring at 80 C until the NCO content of about 2.90% by weight (theoretical) is reached. One hundred forty-four parts by weight of a high molecular weight aromatic material such as lignin will be added with stirring and the reaction mixture will be catalyzed with 0.3 parts by weight of dibutyltin (II) dilaurate. The mixture will then be heated at about 80° C. with constant stirring until an NCO content (titration) of about 0.2% by weight was reached. Finally, about 0.7 parts by weight of benzoyl chloride was added and the product will be cooled to room temperature. A blocked polyurethane prepolymer will be obtained.

Example XXXVI

In a suitable vessel use heat and or pressure to blend about 20 parts (by weight) of a lignin produced from a solvent pulping process and about 80 parts (by weight) of WL-440 (a polyether polyol that is made from a combination of propylene oxide and ethylene oxide) with agitation by using a suitable mixer and heat and higher pressure if necessary. This mixture can be heated to about 200° F. to improve the rate of distribution, incorporation, and blending of the powder into the liquid. The mixing is continued until a dark blend results. The blend is allowed to cool to room temperature. The blend can be heated and mixed until any graininess or seeds dispersed within the material are dissolved or broken down as necessary. The resulting blend has a viscosity of about 494 Centistokes at about 100° F. (37° C.) and a Hydroxyl Number of about 293 mg KOH/g according to ASTM D 4274 which is herein incorporated by reference.

Example XXXVIII

In a suitable vessel use heat and or pressure to blend about 90 parts (by weight) of a lignin produced from a solvent pulping process and about 210 parts (by weight) of WL-440 (a polyether polyol that is made from a combination of propylene oxide and ethylene oxide) with agitation by using a suitable mixer and heat and higher pressure if necessary. This mixture can be heated to about 200° F. to improve the rate of distribution, incorporation, and blending of the powder into the liquid. The mixing is continued until a dark blend results. The blend is allowed to cool to room temperature. The blend can be heated and mixed until any graininess or seeds dispersed within the material are dissolved or broken down as necessary. The resulting blend has a viscosity of about 1532 Centistokes at about 100° F. (37° C.).

Example XXXIX

In a suitable vessel use heat and or pressure to blend about 800 parts (by weight) of a lignin produced from a solvent pulping process and about 200 parts (by weight) of WL-440 (a polyether polyol that is made from a combination of propylene oxide and ethylene oxide) with agitation by using a suitable mixer and heat and higher pressure if necessary. This mixture can be heated to about 200° F. to improve the blending, the mixing is continued until a dark tacky highly viscous material results. The material is then poured out on a surface and allowed to cool. A dark solid material is formed once cooled to room temperature. The resulting material has a Hydroxyl value of about 105 mg KOH/g. The material is also found to have a Softening Point in Water, using Pour Method of about 196.2 F. Additionally, the material has Acid number of about 2.44 mg KOH/g based on ASTM D-3643 which is herein incorporated by reference.

Example XXXXI

In a suitable vessel use heat and or pressure to blend about 40 parts (by weight) of a lignin produced from a solvent pulping process and about 60 parts (by weight) of WL-440 (a polyether polyol that is made from a combination of propylene oxide and ethylene oxide) with agitation by using a suitable mixer and heat and higher pressure if necessary. This mixture can be heated to about 200° F. to improve the blending, the mixing is continued until a dark blend results. The blend is allowed to cool to room temperature.

Example XXXXII

At room temperature the compositions from Examples 36, 38, 39 and 41 are compared. The composition with the higher lignin content from Example 39 is a solid at room temperature. The composition with the lower lignin content from Examples 36, 38 and 41 are liquids at room temperature. The chemical compositions from are compared for viscosity at range of temperatures using a Brookfield viscometer. The composition with the lower lignin content Example 36 has the lowest viscosity at all temperatures.

The blending of lignin in polyol at various concentrations was repeated as indicated above. The level of viscosity along with the Hydroxyl number per ASTM D4274 were recorded in the previous Table.

This table shows that unlike other polyols where typically the Hydroxyl number and viscosity are directly proportional, lignin polyols have the unique property of the Hydroxyl number decreasing as the viscosity increases. The viscosity increases as the percentage by weight of the lignin increases in the lignin polyol composition. These lignin polyol blends have the unique property as the amount of lignin increases, the Hydroxyl number goes down and as a result in polyurethane formulations as the amount of lignin increases the corresponding need for isocyanate in the corresponding A-side of the polyurethane formulation would also decrease.

Example XXXXIII

In a suitable vessel use heat and or pressure to blend about 800 parts (by weight) of a lignin produced from a solvent pulping process and about 100 parts (by weight) of WL-440 (a polyether polyol that is made from a combination of propylene oxide and ethylene oxide) and about 100 parts methyl ethyl ketone with agitation by using a suitable mixer and heat and higher pressure if necessary. This mixture can be heated to about 200° F. to improve the rate of incorporation and distribution of the powder into the liquid, the mixing is continued until a dark tacky highly viscous material results. The material is then poured out on a surface and allowed to cool. A dark solid material is formed once cooled to room temperature.

Example XXXXIV

The melting point of the materials obtained from Examples XXXXIII and XXXIX are compared on a melt bar apparatus. Example XXXXIII is observed to have the higher softening point.

Example XXXXV

The solubility properties of Example I and XXXXI are compared. The lignin used in XXXXI is observed to dissolve into the polyol to produce a dark blend more easily and completely than Example I. The lignin used in Example I has a higher Sodium and ash content than the lignin used in Example XXXXI.

Example XXXXVI

In a suitable vessel use heat and or pressure to blend about 300 parts (by weight) of a lignin produced from a solvent pulping process and about 700 parts (by weight) of poly vinyl chloride with agitation by using a suitable mixer and heat and higher pressure if necessary. This mixture will be heated to about 200° F. to improve the rate incorporation of the powder into the liquid and more even distribution of the powder into the liquid, the mixing is continued until a dark plastic results. The plastic is then allowed to cool to room temperature.

Example XXXXVII

In a suitable vessel use heat and or pressure to blend about 200 parts (by weight) of a lignin produced from a solvent pulping process and about 200 parts (by weight) of SoyOyl® P38N from Polyurethane Soy Systems and about 800 parts (by weight) of WL-440 (a polyether polyol that is made from a combination of propylene oxide and ethylene oxide) will be mixed with agitation by using a suitable mixer and heat and higher pressure if necessary. This mixture will be heated to about 200° F. to improve the rate of incorporation, distribution, and blending; the mixing will be continued until a dark blend results. The blend will be allowed to cool to room temperature. The blend will be heated and mixed until any graininess or seeds dispersed within the material are dissolved or broken down as necessary.

Example XXXXVIII

In a suitable vessel use heat and or pressure to blend about 200 parts (by weight) of a lignin produced from a solvent pulping process and about 200 parts (by weight) of cold pressed degummed soy oil from the Thumb Oilseed Producers' Cooperative of Ubly, Mich. and 800 parts (by weight) of WL-440 (a polyether polyol that is made from a combination of propylene oxide and ethylene oxide) will be mixed with agitation by using a suitable mixer and heat and higher pressure if necessary. This mixture will be heated to about 200° F. to improve the rate of incorporation, distribution, and blending, the mixing will be continued until a dark blend results. The blend will be allowed to cool to room temperature. The blend will be heated and mixed until any graininess or seeds dispersed within the material are dissolved or broken down as necessary.

Example IL

In a suitable vessel use heat and or pressure to blend about 800 parts (by weight) of a lignin produced from a solvent pulping process and about 200 parts by weight of SoyOyl® P38N and about 200 parts (by weight) of WL-440 (a polyether polyol that is made from a combination of propylene oxide and ethylene oxide) with agitation by using a suitable mixer and heat and higher pressure if necessary. In order to facilitate mixing 100 parts of a suitable solvent such as methyl ethyl ketone may be added to ensure the solid liquid is thoroughly wetted out. This mixture will be heated to about 200° F. to improve the rate of distribution, incorporation, and blending. The mixing will be continued until a dark tacky highly viscous material results. The material will then be poured out on a surface and allowed to cool. A dark solid material will be formed once cooled to room temperature. A plastic composition having an increased renewable raw material having lignin in addition to soy oil is formed.

Example L

In a suitable vessel use heat and or pressure to blend about 800 parts (by weight) of a lignin produced from a solvent pulping process and about 200 parts by weight of degummed soy oil from the Thumb Oilseed Producers' Cooperative of Ubly, Mich. and about 200 parts (by weight) of WL-440 (a polyether polyol that is made from a combination of propylene oxide and ethylene oxide) with agitation by using a suitable mixer and heat and higher pressure if necessary. In order to facilitate mixing about 100 parts of a suitable solvent such as methyl ethyl ketone may be added to ensure the solid liquid is thoroughly wetted out. This mixture will be heated to about 200° F. to improve the rate of incorporation, distribution, and blending of the oil with the powder. The mixing will be continued until a dark tacky highly viscous material results. The material will then be poured out on a surface and allowed to cool. A dark solid material will be formed once cooled to room temperature. A plastic composition having an increased renewable raw material having lignin in addition to soy oil is formed.

Example LI

In order to make a thermosetting polyurethane part, about 1.5 parts by weight of the resin of Example XXXXIV is mixed with about 1.25 parts by weight of Rubinate R1840 (an ICI product) and poured into a mold and allowed to harden. The mold can be heated as in a compression mold and this will produce a solid polyurethane foam.

Example LII

In order to make a thermosetting polyurethane part, about 1.5 parts by weight of the resin blend of Example XXXXIV is mixed with about 1.25 parts by weight of Rubinate R1840 (an ICI product) and poured into a mold and allowed to harden. The mold can be heated as in a compression mold and this will produce a solid polyurethane foam.

Example LIII

In order to make a thermosetting polyurethane part, about 1.5 parts by weight of the resin blend of Example II is mixed with about 1 part by weight of SoyOyl® P38N with about 1.25 parts by weight of Rubinate R1840 (an ICI product) and poured into a mold and allowed to harden. The mold can be heated as in a compression mold and this will produce a low density polyurethane foam.

Example LIV

In a suitable vessel use heat and or pressure to blend about 300 parts (by weight) of a lignin produced from a solvent pulping process and about 700 parts (by weight) of WL-440 (a polyether polyol that is made from a combination of propylene oxide and ethylene oxide) and about 100 parts lignin from a semi-mechanical process with agitation by using a suitable mixer and heat and higher pressure if necessary. This mixture can be heated to about 200° F. to improve the rate of blending. The mixing is continued until a dark blend is formed.

Example LV

In order to make a thermosetting polyurethane part, about 1.5 parts by weight of the resin solution of Example XXXXIV is mixed with about 1.25 parts by weight of Rubinate R1840 (an ICI product) and poured into a mold and allowed to harden. The mold can be heated as in a compression mold and this will produce a solid polyurethane foam.

Example LVI

In a suitable vessel use heat and or pressure to blend about 300 parts (by weight) of a lignin produced from a semi-mechanical pulping process and about 700 parts (by weight) of WL-440 (a polyether polyol that is made from a combination of propylene oxide and ethylene oxide) and about 100 parts lignin from a solvent pulping or solvent extraction process with agitation by using a suitable mixer and heat and higher pressure if necessary. This mixture can be heated to about 200° F. to improve the rate of solution, the mixing is continued until a dark solution results. The solution is allowed to cool to room temperature. The solution can be heated and mixed until any graininess or seeds dispersed within the material are dissolved or broken down as necessary.

Example LVII

In order to make a thermosetting polyurethane part, about 1.5 parts by weight of the resin solution of Example XXXXVI is mixed with about 1.25 parts by weight of Rubinate R1840 (an ICI product) and poured into a mold and allowed to harden. The mold can be heated as in a compression mold and this will produce a solid polyurethane foam.

Example LVIII

The samples 1-1-1-5 and 2-1 and 2-2 were prepared by mixing a renewable raw material in the form of powder with a liquid polyol. Two different types of renewable raw material were used. The polyol used in this example was WL-440. Although many other forms of polyols and liquids could be used. Additionally other liquids such as solvents, alcohols, biobased oils, or heat transfer fluids could be used. The process was carried out under atmospheric pressure. The polyol was heated to approximately 110 C by the speed of a high speed disperser mixer such as Cowles Disperser. The liquid was mixed under high shear between about 0.5 to about 2 hours. A polyol was selected with excellent thermal stability, high solubility for the renewable raw material, and low viscosity for used in this processing.

After allowing the mixture to cool, samples were submitted for molecular weight distribution (MWD) and were analyzed according the following conditions:

| | |
|---|---|
| Instrument: | Waters Alliance 2695 liquid chromatograph equipped with quaternary pump, differential refractive index detector, degasser and autosampler |
| Column (s): | 2 PLgel MIXED-E, 3 µm, 300 × 7.5 mm |
| Column Temp: | Ambient |
| Flow rate: | 1.0 mL/min |
| Injection volume: | 50 µL |
| Mobile Phase: | THF (stabilized with BHT), isocratic |
| Calibration Standards | PEG 12600, 7100, 4250, 1580, 960, 200, 106 |

All reported molecular weights distributions are calculated using polyethylene glycol (PEG) standards. They will differ from absolute values depending on the structural and chemical differences between the test substance and PEG

TABLE 13

Molecular Weight Distribution, Acid Value, OH Value, Changes on Renewable Raw Material Based on Process and Composition

| Sample | OH # By Imidazole Catalyzed Acetylation | Acid Value by ASTM D 1639 | % Renewable Raw Starting Material | Peak Molecular Weight | Wt Avg | Num. Avg. | Z Avg | Mw/Mn dispersity | Max Process Temp | Max Process Time |
|---|---|---|---|---|---|---|---|---|---|---|
| Polyol | 302.4 | 0.16 | N/A | 610 | 597 | 558 | 634 | 1.1 | N/A | N/A |
| Renewable Raw Material Type 1 | 240.8 | 50.63 | ~95 | 735 | 1012 | 544 | 1742 | 1.9 | N/A | N/A |
| Sample 1-1 | 292.4 | 4.72 | ~19.8 | 611 | 768 | 559 | 1227 | 1.4 | 130 C. | 0.5 hour |
| Sample 1-2 | 281.8 | 2.89 | ~22 | 613 | 1102 | 642 | 2283 | 1.7 | 220 C. | 2 hours |
| Renewable Raw Material Type 2 | 332.9 | 37.37 | ~95 | 755 | 845 | 496 | 1239 | 1.7 | N/A | N/A |
| Sample 2-1 | 308.8 | 0.28 | ~20.3 | 610 | 715 | 559 | 1020 | 1.3 | 149 C. | 1 hour |
| Sample 2-2 | 324.3 | 1.18 | ~20.3 | 610 | 712 | 557 | 1017 | 1.3 | 149 C. | 1 hour |
| Sample 1-3 | 287.3 | 9.6 | ~40.0 | 611 | 793 | 506 | 1321 | 1.6 | 118 C. | .5 hour |
| Sample 1-4 | 313.4 | 3.61 | ~5.0 | 612 | 626 | 560 | 711 | 1.1 | 139 C. | 0.42 hour |
| Sample 1-5 | 282.1 | 12.74 | ~51.4 | 393 | 963 | 518 | 1705 | 1.9 | 130 C. | 0.68 hour |

The acid number and Hydroxyl number was able to varied significantly based on processing conditions as shown with Samples 1-1 and Samples 1-2. Renewable raw material type 1 is a low Sodium, low salt, low sulfur lignin from a solvent process. Allcell lignin from Repap is one acceptable form and is Type 1 used throughout this application. Renewable Raw Material Type 2 is a sulfur and Sodium containing form of lignin from a kraft lignin process. Indulin AT is an acceptable form and is Type 2 throughout this application. The properties including acid number and Hydroxyl number and various molecular weight distributions are provided in this chart for these materials. All of the samples in this chart contain one of these renewable raw material types and a polyol. For this data set WL 440 polyol was used. Although, other polyols could be used. All of the samples comprised primarily a lignin and a polyol in varying concentrations except for sample 2-2 which also contained diethanolamine.

The polyol and renewable raw material were combined with vigorous mixing as done in the previous examples and in the manner known to those skilled in the art. A Hockmeyer ball mill or dynamic rotor and stator mixer may be used to generate high mixing speeds and dissolve small particles. Temperatures during the high shear mixing reached up to about 110 C in the first half hour. The mixing could also take place under nitrogen atmosphere. A vacuum could also be used to remove water during the heating and mixing. The mixtures were mixed until the renewable raw material was adequately dispersed, incorporated, and in solution with no observable graininess or seeds. When putting a thin film of material on a clear plate of glass and holding up to a light, a thin translucent dark orange or light brown film is obtained with no observable spots.

Additionally, a wide range of values of different properties of molecular weight distributions can be obtained based on the selection of the type of renewable raw material, processing conditions, and additives. Samples 2-1 and 2-2 had nearly identical compositions. However, sample 2-2 had approximately 1.4% diethanolamine added once the polyol composition was cooled to room temperature. The diethanolamine was added in a dropwise fashion and then mixed vigorously. This shows the ability of this material to increase the Hydroxyl value of a polyol composition including renewable raw material.

The optimization of these particular molecular weight distributions is helpful for providing a polyol for use in the right application to provide the appropriate amount of tensile, brittleness, and elongation when cured according to the specific relationship of these molecular weight measurements with specific physical performance properties.

Additionally, the Hydroxyl number, acid number, and molecular weight properties can be adjusted based on the amount of lignin added, the type of lignin and how the material is processed. Materials processed for longer periods of time show reduced acid numbers and increased molecular weights. The reduction in acid number is important to reduce the need for additional catalysts which are basic and allow the polyol to be more suitable in a variety of applications where these basic catalysts may be required.

Example LIX

In addition, when producing high solids adhesives, resins, thixotropic agent for use in coating, adhesive, tackifying, binding and other applications, the type of lignin can have an important effect on the adhesive properties of the resin as well. One measure of compatibility of an adhesive for particular applications is the softening point or glass transition temperature range. This is a measure of when the resin starts to transition from a hard, solid, or glassy phase to a liquid phase. The type and amount of lignin used can have an important effect on this property as well. This property is important when formulating resins, adhesives, coatings, and binders to have the optimal final flow, adhesion, tack, rheology, and strength performance. In one application, the use in shell resins, an adhesive is added to reduce thermal shock. The glass transition temperature is an essential property to ensure that the appropriate amount of thermal shock resistance is provided.

TABLE 14

Glass Transition Temperature and Hydroxyl Number, Acid Number and Tensile Strength Modification

| Sample Resin Product | % Aromatic Starting Material- | Acid No. of Aromatic Starting Material | Sodium of Aromatic Starting Material | Acid Number of Solid Resin | Hydroxyl value of Resin Product | Glass Transition Temp[1] Avg. | Endotherm-[1] | Tensile (PSI) Avg. |
|---|---|---|---|---|---|---|---|---|
| LR-6A-2 | 60.1 | 37.37 | ~1% | 40.49 | 309 | 43.5 | 69 C. | N/A |
| LR 32-1 | 80.6 | 38-50 | 69 ppm | 20.1 | 250.0 | 23.0 | 87 C. | 12.5 |
| LR-32-B | 80.1 | 38-50 | 69 ppm | 21.2 | 255.1 | 39.5 | 72 & 97 C. | 16 |
| LR-32-C | 60.7 | 38-50 | 69 ppm | 20.3 | 240.9 | 22.5 | 80 C. | 35 |
| LR 32-D | 80.4 | 38-50 | 69 ppm | 20.9 | 239.5 | 33.5 | 80 C. | 15 |

1—The samples were sealed in an aluminum hermetic pan and then scanned twice in a TAI DSC 2920 in nitrogen from −50 to 150 C at 20 C/min. The DSC instrument was calibrated with indium and water standards, and the nominal nitrogen purge rate was about 50 ml/min. The glass transition temperature (Tg) was determined with a six-point line, and the endothermic peak area was calculated using a two-point sigmoidal baseline. Approximately 5 to about 6 mg of samples were used. (The samples were hand-ground into powder to obtain good thermal contact between the sample and pan, and to minimize the thermal gradients.)

2—Samples were prepared by adding a clear polyol to a heated vessel. The polyol was heated to approx. 200 C and then the aromatic starting material was added slowly as part of at least three separate aliquots as a solid powder and mixed until the powder was fully melted and mixed into the liquid. A dark solid molten liquid was formed. The mixing was stopped. The heat on the vessel was stopped.

Sample 6A was processed further by taking approximately about 76% Renewable aromatic material and combining with 24% polyol by weight and mixing together to form a first mixture. This first mixture was used to form a second mixture comprising about 20% methanol and about 80% of the first mixture by weight. This second mixture was mixed under heat where the vessel was heated up to approximately 200 C for about 30 minutes. A higher melting thermoplastic resin was obtained.

An increased glass transition temperature was provided thermoplastic resin by using a Polyester polyol with an increased aromatic content, Terate 2033 in 32-B. Additionally, using a different type of renewable raw material and a processing it with for increased solids also lead to an increased glass transition temperature for sample 6A.

Samples 32-1, 32-B, and 32-D were made with about 80 parts per hundred of Lignin Type1 Sample 32C was made with about 60 parts per hundred of Lignin Type 1. Sample 32-1 was made with about 20 parts per hundred WL-440 from Huntsman as the polyol component of the thermoplastic blend. Sample 32 B was made with about 20 parts per hundred Terate 2033 from Invista as the polyol component of the blend. Sample 32C was made with about 4.6 parts per hundred by weight Agrol 3.0 from Biobased Technologies Rogers, Ark. and 34.7 parts per hundred by weight of WL 440. Sample 32D was made with about 4.5 parts per hundred by weight Agrol 1.3 from Biobased Technologies Rogers, Ark., 15.1 WL-440 from Huntsman.

The samples were mixed from until a consistent molten liquid was achieved. They were poured into a dog bone mold having a 1 inch cross section. Remaining parts of the sample were used for molecular weight and glass transition temperature testing. These samples show compositions of renewable aromatic material in combination with soy biobased polyols to make resins. These resins can be used in solid form or used as intermediates for combination with other materials.

TABLE 14B

Molecular Weight Distribution of Thermoplastic Resin

| Sample | OH # By Imidazole Catalyzed Acetylation | Acid Value by ASTM D 1639 | % Renewable Aromatic Raw Starting Material | Peak Molecular Weight | Wt Avg | Num. Avg. | Z Avg | Mw/Mn dispersity |
|---|---|---|---|---|---|---|---|---|
| 32-1 | 250 | 20 | 80.6 | 619 | 887 | 496 | 1514 | 1.8 |
| 32-B | 255.1 | 21.16 | 80.2 | 628 | 891 | 493 | 1505 | 1.8 |
| 32-C | 240.9 | 20.26 | 60.7 | 619 | 921 | 511 | 1590 | 1.8 |
| 32-D | 239.5 | 20.87 | 80.4 | 620 | 922 | 512 | 1543 | 1.8 |

Example LX

Reaction studies were performed using Sample 1-2 Polyol and reacted with Bayer's Mondur ML MDI. Reactions were carried out at room temperature and at elevated temperatures with and without catalyst. Union Carbide's PT 700 trifunctional polyol was used as a "control". Sample 1-2's polyol data is summarized below.

TABLE 15

Comparison of Renewable Raw Material In Polyol Application

| Property | Sample 1-2 Polyol | PT 700 |
|---|---|---|
| Mol. Wt. | 1102 | 700 |
| OH No. | 281.8 | 239.8 |
| Acid No. | 2.89 | 0 |

TABLE 16

Comparison of Renewable Raw Material In Polyurethane Application

| Material | A121 | B121 | C121 | D121 | E121 | F121 |
|---|---|---|---|---|---|---|
| Mondur ML Weight (g) | 38.4 | 34.4 | 38.4 | 34.4 | 38.4 | 34.4 |
| Sample 1-2 Polyol Weight (g) | 61.4 | N/A | 61.4 | N/A | 61.4 | N/A |
| PT 700 Weight (g) | N/A | 65 | N/A | 65 | N/A | 65 |
| Dabco T-12 Weight (g) | 0 | 0 | .2 | .2 | .5 | .5 |
| Temp (F.) | 73 | 73 | 300 | 300 | 73 | 73 |
| Cure Time | 24 hr | 24 hr | 15 min | 15 min | 60 min | 45 min |
| Hardness-Shore A | 55 | 10 | N/A | N/A | N/A | N/A |
| Hardness Shore B | N/A | N/A | 50 | 50 | 50 | 25 |
| Color | Black | Clear | Black | Clear | Black | Clear |

The use of Sample 1-2 Polyol with a renewable raw material in Polyurethane Application was shown to provide increased hardness according to Shore B measurements at room temperature in one hour and Shore A measurements following 24 hour cure.

All the percentages provided are based on a comparison of weights of the specific component to the total resin, unless otherwise noted. The contents of all publications, patents and patent applications, standards, test methods, and procedures are incorporated herein by reference to the same extent as if each individual publication, patent or patent application was specifically and individually indicated to be incorporated by reference. Although the invention has been described with particular reference to certain preferred embodiments, variations and modifications can be effected without deviating from the spirit and scope of the invention as defined in the following claims.

What is claimed is:

1. A thermoplastic composition comprising from 1.5 wt % to 30 wt % of a polyol component, wherein said polyol component consists of lignin-derived polyols, wherein said composition does not contain a polyol that is not derived from lignin, and wherein said lignin-derived polyols have a hydroxyl number from 240 mg KOH/g to 340 mg KOH/g and an acid number from 16.9 mg KOH/g to 37.4 mg KOH/g; said composition further comprising from 500 ppm to 76,097 ppm of at least two elements selected from the group consisting of sodium, potassium, calcium, magnesium, lithium, iron, sulfur, and barium.

2. The thermoplastic composition of claim 1, said composition comprising from 20 wt % to 30 wt % of said lignin-derived polyols.

3. The thermoplastic composition of claim 1, wherein said thermoplastic composition has a composition acid number less than 4 mg KOH/g.

4. The thermoplastic composition of claim 1, wherein said thermoplastic composition has a composition hydroxyl number greater than 100 mg KOH/g.

5. The thermoplastic composition of claim 1, said composition comprising from 500 ppm to 66,000 ppm sodium.

6. The thermoplastic composition of claim 5, said composition comprising from 500 ppm to 10,000 ppm sodium.

7. The thermoplastic composition of claim 1, said composition further comprising one or more viscosity modifiers.

* * * * *